US012693711B2

(12) United States Patent
Ramsay et al.

(10) Patent No.: US 12,693,711 B2
(45) Date of Patent: Jul. 28, 2026

(54) LOCKING MECHANISM FOR THIN BEZEL AND REPAIRABLE DEVICE

(71) Applicant: reMarkable AS, Oslo (NO)

(72) Inventors: Steffi Ramsay, Oslo (NO); Johan Nyman, Lund (SE); Siri Törnqvist, Arlöv (SE); Øyvind Sanden, Oslo (NO)

(73) Assignee: reMarkable AS, Oslo (NO)

( * ) Notice: Subject to any disclaimer, the term of this patent is extended or adjusted under 35 U.S.C. 154(b) by 138 days.

(21) Appl. No.: 18/769,895

(22) Filed: Jul. 11, 2024

(65) Prior Publication Data

US 2026/0016857 A1 Jan. 15, 2026

(51) Int. Cl.
*G06F 1/16* (2006.01)
(52) U.S. Cl.
CPC .......... *G06F 1/1656* (2013.01); *G06F 1/1626* (2013.01); *G06F 1/1654* (2013.01); *G06F 1/1679* (2013.01)
(58) Field of Classification Search
CPC ........ G06F 1/16; G06F 1/1601; G06F 1/1616; G06F 1/1626; G06F 1/1637; G06F 1/1656; G06F 1/166; G06F 1/1679; G06F 1/188; H05K 5/0221; H05K 5/15; H05K 5/02; H05K 5/0208; H04M 1/026; H04M 1/0266; H04M 1/03; H04N 5/64; G02F 1/133308
See application file for complete search history.

(56) References Cited

U.S. PATENT DOCUMENTS

| | | | |
|---|---|---|---|
| 6,064,765 A | 5/2000 | Hirayama | |
| 6,151,206 A | 11/2000 | Kato | |
| 7,126,651 B2 * | 10/2006 | Kim ................. | G02F 1/133308 349/64 |
| 7,145,092 B2 | 12/2006 | Tuhkala | |
| 7,239,505 B2 | 7/2007 | Keely | |
| 7,417,851 B2 * | 8/2008 | Chen ..................... | G06F 1/1616 361/727 |
| 7,461,444 B2 | 12/2008 | Deaett | |
| 7,545,629 B1 * | 6/2009 | Bauer, Jr. .............. | G06F 1/1616 40/781 |

(Continued)

FOREIGN PATENT DOCUMENTS

| | | |
|---|---|---|
| CN | 104142705 A | 11/2014 |
| DE | 202013101011 U1 | 5/2013 |

(Continued)

OTHER PUBLICATIONS

Extended European Search Report, EP application 25173426.5, issued by the European Patent Office.

(Continued)

*Primary Examiner* — Gage Crum
(74) *Attorney, Agent, or Firm* — AWA Sweden AB; Thomas L. Ewing

(57) ABSTRACT

Embodiments of the invention provide a locking mechanism for a tablet computer, the locking mechanism comprising at least three locking plates having an open position and a locked position, wherein when the locking plates are in the locked position, the first tablet half of the tablet computer is coupled to the second half of the tablet computer. The locking plates enable the tablet computer to have a thinner bezel than conventional tablet computers which facilitates repair of the tablet computer.

18 Claims, 16 Drawing Sheets

(56) References Cited

U.S. PATENT DOCUMENTS

| | | | |
|---|---|---|---|
| 7,606,023 B2 * | 10/2009 | Konno | G06F 1/1616 |
| | | | 361/679.02 |
| 7,722,358 B2 | 5/2010 | Chatterjee et al. | |
| 7,941,191 B2 | 5/2011 | Hanssen | |
| D645,465 S | 9/2011 | Lin | |
| 8,022,307 B2 | 9/2011 | Chu et al. | |
| 8,143,983 B1 | 3/2012 | Lauder et al. | |
| D671,114 S | 11/2012 | Akana | |
| 8,319,099 B2 * | 11/2012 | Xu | H05K 5/0221 |
| | | | 292/194 |
| 8,498,100 B1 | 7/2013 | Whitt et al. | |
| D689,482 S | 9/2013 | Akana | |
| D692,886 S | 11/2013 | Bates | |
| D701,205 S | 3/2014 | Akana | |
| D702,229 S | 4/2014 | Lim | |
| 8,688,037 B2 | 4/2014 | Chatterjee et al. | |
| D704,702 S | 5/2014 | Akana | |
| D705,775 S | 5/2014 | Canizares | |
| 8,724,302 B2 | 5/2014 | Whitt et al. | |
| 8,780,541 B2 | 7/2014 | Whitt et al. | |
| D711,371 S | 8/2014 | Chen | |
| 8,817,457 B1 | 8/2014 | Colby et al. | |
| 8,873,227 B2 | 10/2014 | Whitt et al. | |
| 8,947,864 B2 | 2/2015 | Whitt et al. | |
| 8,947,868 B2 | 2/2015 | Motoishi et al. | |
| 8,964,379 B2 | 2/2015 | Rihn | |
| 9,017,092 B1 | 4/2015 | McCracken | |
| 9,146,620 B2 | 9/2015 | Whitt et al. | |
| 9,149,100 B2 | 10/2015 | Marshall | |
| 9,218,025 B2 | 12/2015 | Bates | |
| 9,244,535 B2 | 1/2016 | Bates | |
| D750,621 S | 3/2016 | Loor Canizares | |
| 9,280,181 B2 | 3/2016 | Tomita et al. | |
| 9,335,793 B2 | 5/2016 | Rothkopf | |
| 9,390,869 B2 | 7/2016 | Lee | |
| 9,436,229 B2 | 9/2016 | Yoo | |
| 9,442,518 B2 | 9/2016 | Siddiqui | |
| 9,443,673 B2 | 9/2016 | Chu | |
| 9,451,822 B2 | 9/2016 | Gu | |
| 9,494,976 B2 | 11/2016 | Bates | |
| 9,494,977 B2 | 11/2016 | Spollen | |
| 9,496,102 B2 | 11/2016 | Bates | |
| D773,454 S | 12/2016 | Akana | |
| D776,116 S | 1/2017 | Akana | |
| 9,532,631 B2 | 1/2017 | Gu | |
| 9,552,014 B2 | 1/2017 | Tomita | |
| D779,485 S | 2/2017 | Akana | |
| 9,575,515 B2 | 2/2017 | Leon | |
| 9,578,757 B2 * | 2/2017 | Jacobs | G06F 1/1656 |
| 9,588,551 B1 | 3/2017 | Hegde | |
| 9,621,214 B2 | 4/2017 | Paek | |
| 9,632,602 B2 | 4/2017 | Marwah | |
| D786,238 S | 5/2017 | Roberts | |
| 9,678,542 B2 | 6/2017 | Whitt et al. | |
| D792,393 S | 7/2017 | Akana | |
| 9,705,242 B1 | 7/2017 | Heiskanen | |
| 9,705,243 B1 | 7/2017 | McCracken | |
| 9,715,251 B2 | 7/2017 | Chung | |
| D795,249 S | 8/2017 | Wall | |
| 9,720,453 B2 | 8/2017 | Nelson | |
| 9,728,915 B2 | 8/2017 | Aldehayyat | |
| 9,760,183 B2 | 9/2017 | Kawaguchi | |
| 9,762,279 B2 | 9/2017 | Lee | |
| 9,769,293 B2 | 9/2017 | Gu | |
| D801,330 S | 10/2017 | Morgan | |
| 9,778,705 B2 | 10/2017 | Esmaeili | |
| 9,785,193 B2 | 10/2017 | Sano | |
| 9,823,093 B2 | 11/2017 | Kauhaniemi | |
| D804,470 S | 12/2017 | Hallar | |
| 9,840,861 B1 | 12/2017 | Määttä | |
| 9,851,759 B2 | 12/2017 | Tazbaz | |
| D807,348 S | 1/2018 | Wang | |
| 9,883,583 B2 | 1/2018 | Cousins | |
| D810,075 S | 2/2018 | Liu | |
| D810,745 S | 2/2018 | Luo | |
| 9,893,452 B2 | 2/2018 | Wagman | |
| 9,904,327 B2 | 2/2018 | Whitt et al. | |
| 9,904,373 B2 | 2/2018 | Shirata | |
| 9,930,773 B2 | 3/2018 | Holbery | |
| 9,946,295 B2 | 4/2018 | Smith | |
| 9,946,296 B2 | 4/2018 | Smith | |
| 9,952,623 B2 | 4/2018 | Tomita | |
| 9,965,000 B2 | 5/2018 | Koppal | |
| 9,977,460 B2 | 5/2018 | Wagman | |
| D820,838 S | 6/2018 | Akana | |
| D820,839 S | 6/2018 | Akana | |
| D820,840 S | 6/2018 | Akana | |
| D820,841 S | 6/2018 | Akana | |
| 9,997,305 B2 | 6/2018 | Wang | |
| 9,997,308 B2 | 6/2018 | Leong | |
| 9,998,166 B2 | 6/2018 | Kim | |
| 10,013,030 B2 | 7/2018 | Whitt et al. | |
| 10,050,368 B2 | 8/2018 | Wagman | |
| 10,056,205 B2 | 8/2018 | Hegde | |
| 10,061,359 B2 | 8/2018 | Määttä | |
| 10,082,840 B2 | 9/2018 | Esmaeili | |
| 10,082,913 B2 | 9/2018 | Moller | |
| 10,090,121 B2 | 10/2018 | Winter | |
| D832,836 S | 11/2018 | Akana | |
| D835,097 S | 12/2018 | Morgan | |
| 10,153,577 B2 | 12/2018 | Wagman | |
| D839,266 S | 1/2019 | Chang | |
| 10,175,782 B2 | 1/2019 | Katsuhara | |
| D842,852 S | 3/2019 | Kim | |
| 10,257,950 B2 | 4/2019 | Määttä | |
| 10,289,210 B1 | 5/2019 | Wang | |
| 10,303,209 B2 | 5/2019 | Smith | |
| 10,303,215 B2 | 5/2019 | Corbin | |
| 10,317,953 B2 | 6/2019 | Esmaeili | |
| D852,794 S | 7/2019 | Huebner | |
| 10,345,916 B2 | 7/2019 | Gu | |
| 10,353,485 B1 | 7/2019 | Zhang | |
| 10,362,670 B2 | 7/2019 | Cousins | |
| D856,322 S | 8/2019 | Huebner | |
| 10,372,159 B2 | 8/2019 | Kim | |
| 10,418,741 B2 | 9/2019 | Wagman | |
| D867,452 S | 11/2019 | Morris | |
| 10,466,804 B2 | 11/2019 | Murphy | |
| 10,468,211 B2 | 11/2019 | Leong | |
| 10,474,199 B2 | 11/2019 | Longo | |
| 10,481,746 B2 | 11/2019 | Moller | |
| 10,483,688 B2 | 11/2019 | Wrisley | |
| 10,520,127 B2 | 12/2019 | Dearsley | |
| 10,551,878 B2 | 2/2020 | Longo | |
| 10,566,151 B1 | 2/2020 | Wang | |
| 10,579,097 B2 | 3/2020 | Wagman | |
| 10,590,600 B1 | 3/2020 | Wang | |
| 10,635,186 B1 | 4/2020 | Wang | |
| 10,672,548 B2 | 6/2020 | Srinivasan | |
| 10,683,591 B1 | 6/2020 | Podhajny | |
| 10,732,728 B1 | 8/2020 | Sunshine | |
| 10,739,825 B2 | 8/2020 | Gilbert | |
| 10,754,393 B2 | 8/2020 | Campbell | |
| D901,486 S | 11/2020 | Moon | |
| 10,890,954 B2 | 1/2021 | Evans | |
| 10,908,652 B2 | 2/2021 | Määttä | |
| 10,921,863 B2 | 2/2021 | Gault | |
| 10,923,261 B2 | 2/2021 | Singla | |
| 10,936,020 B2 | 3/2021 | Chang | |
| 10,948,999 B2 | 3/2021 | Hewett | |
| 11,023,016 B2 | 6/2021 | Kim | |
| 11,048,304 B2 | 6/2021 | Kang | |
| 11,048,337 B2 | 6/2021 | Fukumoto | |
| 11,061,442 B2 | 7/2021 | Gault | |
| 11,062,831 B2 | 7/2021 | Määttä | |
| 11,066,861 B2 | 7/2021 | Zhu | |
| 11,073,871 B2 | 7/2021 | Jung et al. | |
| D928,145 S | 8/2021 | Solberg | |
| D928,146 S | 8/2021 | Solberg | |
| 11,086,975 B2 | 8/2021 | Huang et al. | |
| 11,091,855 B2 | 8/2021 | Holbery | |
| 11,095,071 B2 | 8/2021 | Lee | |
| 11,119,535 B2 | 9/2021 | Haworth | |
| 11,211,212 B2 | 12/2021 | Huang | |

(56) References Cited

U.S. PATENT DOCUMENTS

| | | | | | |
|---|---|---|---|---|---|
| 2003/0034960 | A1 | 2/2003 | Li | | |
| 2004/0203518 | A1* | 10/2004 | Zheng | H04M 1/0249 | |
| | | | | | 455/90.3 |
| 2008/0142676 | A1* | 6/2008 | Hobden | G01C 9/02 | |
| | | | | | 248/687 |
| 2011/0147398 | A1 | 6/2011 | Ahee | | |
| 2011/0182010 | A1* | 7/2011 | Schouten | G06F 1/1637 | |
| | | | | | 361/679.01 |
| 2011/0199728 | A1 | 8/2011 | Reyes | | |
| 2012/0106078 | A1* | 5/2012 | Probst | G06F 1/1681 | |
| | | | | | 361/679.56 |
| 2013/0135827 | A1* | 5/2013 | Chao | H05K 5/15 | |
| | | | | | 361/747 |
| 2013/0209866 | A1* | 8/2013 | Watanabe | H04M 1/0262 | |
| | | | | | 429/163 |
| 2013/0328794 | A1* | 12/2013 | Cheng | G06F 3/0416 | |
| | | | | | 345/173 |
| 2013/0342484 | A1* | 12/2013 | Bae | G06F 1/1656 | |
| | | | | | 345/173 |
| 2014/0016996 | A1* | 1/2014 | Chung | H05K 5/0221 | |
| | | | | | 403/321 |
| 2014/0211393 | A1 | 7/2014 | Lee | | |
| 2014/0211921 | A1* | 7/2014 | Bandis | H01M 50/247 | |
| | | | | | 429/96 |
| 2014/0300258 | A9* | 10/2014 | Yang | G06F 1/1656 | |
| | | | | | 312/223.1 |
| 2014/0353981 | A1* | 12/2014 | Su | G06F 1/1626 | |
| | | | | | 292/195 |
| 2015/0061475 | A1* | 3/2015 | Fairchild | H05K 5/0221 | |
| | | | | | 312/223.1 |
| 2015/0146350 | A1* | 5/2015 | Tsukahara | B60R 11/0235 | |
| | | | | | 361/679.01 |
| 2016/0033996 | A1* | 2/2016 | Lee | F16B 5/02 | |
| | | | | | 361/679.26 |
| 2016/0120042 | A1 | 4/2016 | Jacobs | | |
| 2019/0079563 | A1* | 3/2019 | Wu | G06F 1/166 | |
| 2021/0069575 | A1* | 3/2021 | Parker | A41D 19/01564 | |
| 2022/0077617 | A1* | 3/2022 | Zhang | H01R 13/639 | |
| 2023/0213986 | A1* | 7/2023 | Liu | G06F 1/182 | |
| | | | | | 361/679.34 |
| 2023/0418338 | A1* | 12/2023 | Kanas | G06F 1/1616 | |
| 2024/0126347 | A1 | 4/2024 | Goh | | |
| 2024/0155790 | A1* | 5/2024 | Sekar | H05K 9/0024 | |
| 2025/0321613 | A1* | 10/2025 | Doglio | G06F 1/1679 | |

FOREIGN PATENT DOCUMENTS

| | | | | | |
|---|---|---|---|---|---|
| EP | 2675240 | A1 * | 12/2013 | | G06F 1/1698 |
| WO | 2001031457 | A1 | 5/2001 | | |
| WO | 2021194484 | A1 | 9/2021 | | |

OTHER PUBLICATIONS

A publication regarding the Aspire Switch 10 ("Acer") published on Aug. 1, 2014.

PCT International Search Report and Written Opinion, PCT Application No. PCT/IB2022/000703, Jun. 2, 2023, 19 pages.

* cited by examiner

600

400

701a    801    701c

400

407    701b    701d

400    404

701b    701a

400

701c    701d

401b

1701a2

1208a

1201a

1701b2

1701b

1201b

1701b1

403

1701a1

1208b 1701a1

1701c1

1201c

1701c2

LOCKING MECHANISM FOR THIN BEZEL AND REPAIRABLE DEVICE

TECHNICAL FIELD

The disclosure relates generally to tablet devices, such as tablet devices that replicate to replicate the feel of writing on paper. In particular, embodiments of the present invention relate to a locking mechanism that enables a thinner bezel on tablet devices and also enables tablet devices to become more easily repairable.

BACKGROUND

FIG. 1 illustrates a conventional tablet device 100 having a relatively wide (or thick) bezel 101 that surrounds a display 103. Tablet devices conventionally comprise an upper or top half 109a and a lower or bottom half 109b with the two tablet halves 109a, 109b conventionally assembled into the unified tablet device 100 with the aid of adhesive tape and screws. As shown in FIG. 1, the two halves 109a, 109b of the tablet 100 are held together using a wide adhesive tape 105 whose dimensions essentially match the size of the bezel 101. In order to secure the tablet device 100 properly, the conventional approach requires that the bezel 101 (the rim around the tablet device 100 that frames its display 103) have a certain level of width (or thickness) in order for the adhesive tape 105 to have sufficient bonding strength to adhere the two halves 109a, 109b of the tablet device 100. A set of screws typically located at each corner on the backside of the tablet 100, complement the adhesive tape 105 in holding together the two halves 109a, 109b of the tablet 100. The approximate location for one set of corner screws 107 is shown in FIG. 1 but the screws themselves would be visible from the backside of the bottom half 109b.

This conventional assembly methodology has several limitations. One limitation is that the adhesive tape 105 and screws 107 adhere the two halves 109a, 109b of the tablet device 100 together so tightly that the tablet device 100 either cannot be disassembled without destroying it or a concerted effort by specialized equipment is required to disassemble the tablet device 100. In any event, tablet devices 100 assembled in this conventional manner are not typically amendable to repair. In addition, the relative thickness of the bezel 101 reduces the percentage of the front of the tablet device 100 that is occupied by the display 103. Some users may also find that a thinner bezel 103 leads to a more aesthetically pleasing tablet device 100 because the display 103 will occupy a larger percentage of the front of the device.

While many improvements have been made to the tablet design and assembly in recent years, consumers would benefit from still further improvements in tablet device design and assembly.

SUMMARY OF THE INVENTION

Embodiments of the invention provide a locking mechanism for a tablet computer, the locking mechanism comprising at least three locking plates having an open position and a locked position, wherein when the locking plates are in the locked position, the first tablet half of the tablet computer is coupled to the second half of the tablet computer. One end of each locking plates reside over a hole that passes from one half of the tablet computer through to the backside, passing through a volcano foot. The hole allows for the locking plate to be moved into a locked position such that the tablet device may be used in its normal mode but may be re-opened later. The locking plates enable the tablet computer to have a thinner bezel than conventional tablet computers which facilitates repair of the tablet computer.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The figures depict various embodiments of the presented invention for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. An ordinarily skilled artisan will readily recognize from the following description that alternative embodiments of the structures and methods illustrated herein may be employed without departing from the principles described herein.

Overview

Disclosed is a system and related process) for enabling a tablet device to have a thinner bezel by adding a mechanical locking mechanism to the tablet device that locks a top half of the tablet device to the bottom half of the tablet device. The presence of the mechanical locking mechanism and the thinner bezel also enables the two halves of the tablet device to be later separated to enable repair, replacement, and/or upgrading of various components within the tablet device. A description of embodiments of this invention begins at FIG. 12. Before describing the invention in greater detail, a description will be provided of a representative embodiment of an e-paper tablet device that is suitable for inclusion with the thinner bezel and locking mechanism.

Example Tablet System and Configuration

Figures 1, 2:
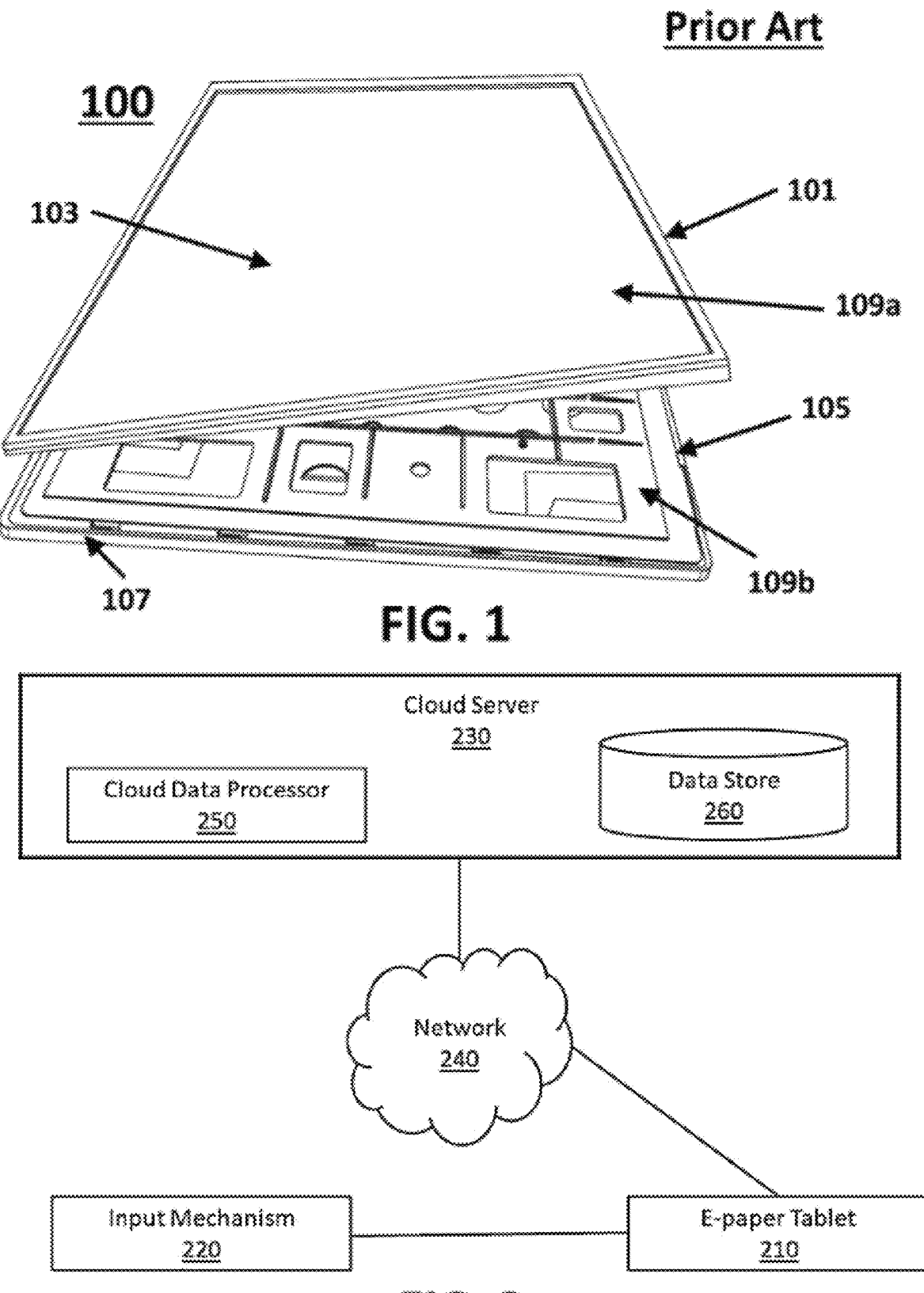
FIG. 1 illustrates a conventional tablet device 100 in the prior art having a relatively thick bezel 101 that surrounds a display 103.
FIG. 2 illustrates a system architecture for an e-paper tablet device 210 that receives inputs from an input mechanism such as a pen-stylus, according to one example embodiment.

As shown in FIG. 2, an e-paper tablet device 210 receives inputs from the input mechanism 220, for example, when the input mechanism 220 makes physical contact with a contact-sensitive surface (e.g., the touch-sensitive screen) on the e-paper tablet device 210 as the user makes a gesture of some sort with the input mechanism 220. The input mechanism 220 may be a finger, pen-stylus or marker. The tablet device 210 here is referred to as an "e-paper tablet," a device that mimics the feeling of writing with ordinary pen and paper for users of the device. Such devices are also known as "electronic paper" and "electronic ink". Based on the nature of the contact, the e-paper tablet device 210 generates and executes instructions for updating content displayed on the contact-sensitive screen to reflect the gesture inputs. For example, in response to a gesture transcribing a verbal message (e.g., a written text or a drawing), the e-paper tablet device 210 updates the contact-sensitive screen to display the transcribed message. As another example, in response to a gesture selecting a navigation option, the e-paper tablet device 210 updates the screen to display a new page associated with the navigation option. While embodiments of the invention have been designed for e-paper systems, embodiments of the invention may also be suitable for other forms of computing devices capable of receiving and processing inputs from pen-stylus devices.

The input mechanism 220 may refer to any device or object that is compatible with the contact-sensitive screen of the e-paper tablet device 210, in particular a pen-stylus device, such as a so-called active pen device having its own power source or a static pen that receives its power from engagement with the contact-sensitive screen on the e-paper tablet device 210. In one embodiment, the input mechanism 220 may work with an electronic ink (e.g., E-ink) contact-sensitive screen. For example, the input mechanism 220 may refer to any device or object that can interface with a screen and, from which, the screen can detect a touch or contact of said input mechanism 220. Once the touch or contact is detected, electronics associated with the screen generate a signal which the e-paper tablet device 210 can process as a gesture that may be provided for display on the screen. Upon detecting a gesture by the input mechanism 220, electronics within the contact-sensitive screen generate a signal that encodes instructions for displaying content or updating content previously displayed on the screen of the e-paper tablet device 210 based on the movement of the detected gesture across the screen. For example, when processed by the e-paper tablet device 210, the encoded signal may cause a representation of the detected gesture to be displayed on the screen of the e-paper tablet device 210, such as a scribble. As mentioned, the input mechanism 220 may be a pen-stylus or another type of pointing device, including a part of a user's body, such as a finger.

In one embodiment, the input mechanism 220 is an encased magnetic coil. When in proximity to the screen of the e-paper tablet device 210, the magnetic coil helps generate a magnetic field that encodes a signal that communicates instructions, which are processed by the e-paper tablet device 210 to provide a representation of the gesture for display on the screen, e.g., as a marking. The input mechanism 220 may be force (e.g., pressure) and tilt-sensitive such that the system can make natural, visual response to both the pressure and tilt applied by the user. In turn, the interaction between the input mechanism and the contact-sensitive screen of the e-paper tablet device 210 may generate a different encoded signal for processing, for example, to provide for display a representation of the gesture on the screen that has different characteristics, e.g., thicker line marking. In alternate embodiments, the input mechanism 220 includes a power source (e.g., a battery) which can generate an electric field with a contact-sensitive surface. It is noted that the encoded signal is a signal that is generated and may be communicated. The encoded signal may have a signal pattern that may be used for further analog or digital analysis (or interpretation).

In one embodiment, the contact-sensitive screen is a capacitive touchscreen. The screen may be designed using a glass or polymer material coated with a conductive material. Electrodes, or an alternate current carrying electric component, are arranged along the coating of the screen (e.g., in a diamond-shaped cross hatch) to maintain a constant level of current running throughout the screen. A second set of electrodes are arranged horizontally. The matrix of vertical active electrodes and horizontal inactive electrodes generates an electrostatic field at each point on the screen. When an input mechanism 220 with conductive properties, for example the encased magnetic coil, a human finger, or something else that triggers the capacitive effect, is brought into contact with an area of the screen of the e-paper tablet device 210, current flows through the horizontally arranged electrodes, disrupting the electrostatic field at the contacted point on the screen. The disruption in the electrostatic field at each point that a gesture covers may be measured, for example as a change in capacitance, and encoded into an analog or digital signal.

In an alternate embodiment, the contact-sensitive screen is a resistive touchscreen. The resistive touch screen comprises two metallic layers: a first metallic layer in which striped electrodes are positioned on a substrate, such as a glass or plastic and a second metallic layer in which transparent electrodes are positioned. When contact from an input mechanism, for example a pen-stylus, finger, or palm, is made on the surface of the touchscreen, the two layers are pressed together. Upon contact, a voltage gradient is applied to the first layer and measured as a distance by the second layer to determine a horizontal coordinate of the contact on the screen. The voltage gradient is subsequently applied to the second layer to determine a vertical coordinate of the contact on the screen. The combination of the horizontal coordinate and the vertical coordinate register an exact location of the contact on the contact-sensitive screen. Unlike capacitive touchscreens which rely on conductive input mechanisms, a resistive touchscreen is configured to sense contact from nearly any input mechanism. Although some embodiments of the e-paper tablet device 210 are described herein with reference to a capacitive touchscreen, one skilled in the art would recognize that a resistive touchscreen could also be implemented.

In an alternate embodiment, the contact-sensitive screen is an inductive touchscreen. An inductive touchscreen comprises a metal front layer that is configured to detect deflections when contact is made on the screen by an input mechanism. Accordingly, an inductive touchscreen is configured to sense contact from nearly any input mechanism. Although some embodiments of the e-paper tablet device 210 are described herein with reference to a capacitive touchscreen, an ordinarily skilled artisan would recognize that alternative touchscreen technology may be implemented, for example, an inductive touchscreen could also be implemented.

The cloud server 230 is configured to receive information from the e-paper tablet device 210 and/or communicate instructions to the e-paper tablet device 210, according to some embodiments of the invention. As illustrated in FIG. 2, the cloud server 230 may comprise a cloud data processor 250 and a data store 260. Data recorded and stored by the e-paper tablet device 210 may be communicated via the network 240 to the cloud server 230 for storage in the data store 260. For example, the data store 260 may store documents, images, or other types of content generated or recorded by a user through the e-paper tablet device 210. In some embodiments, the cloud data processor 250 monitors the activity and usage of the e-paper tablet device 210 and communicates processing instructions to the e-paper tablet device 210. For example, the cloud data processor 250 may regulate synchronization protocols for data stored in the data store 260 with the e-paper tablet device 210.

Interactions between the e-paper tablet device 210 and the cloud server 230 are typically performed via the network 240, which enables communication between the e-paper tablet device 210 and the cloud server 230. In one embodiment, the network 240 uses standard communication technologies and/or protocols including, but not limited to, links using technologies such as Ethernet, 802.11, worldwide interoperability for microwave access (WiMAX), 3G, 4G, LTE, digital subscriber line (DSL), asynchronous transfer mode (ATM), InfiniBand, and PCI Express Advanced Switching. The network 240 may also utilize dedicated, custom, or private communication links. The network 240 may comprise any combination of local area and/or wide area networks, using both wired and wireless communication systems. The cloud server 230 may be alternatively implemented, and in some embodiments may be replaced by hardware and software that provide similar functionality while possibly not being considered a conventional cloud server.

Figure 3:
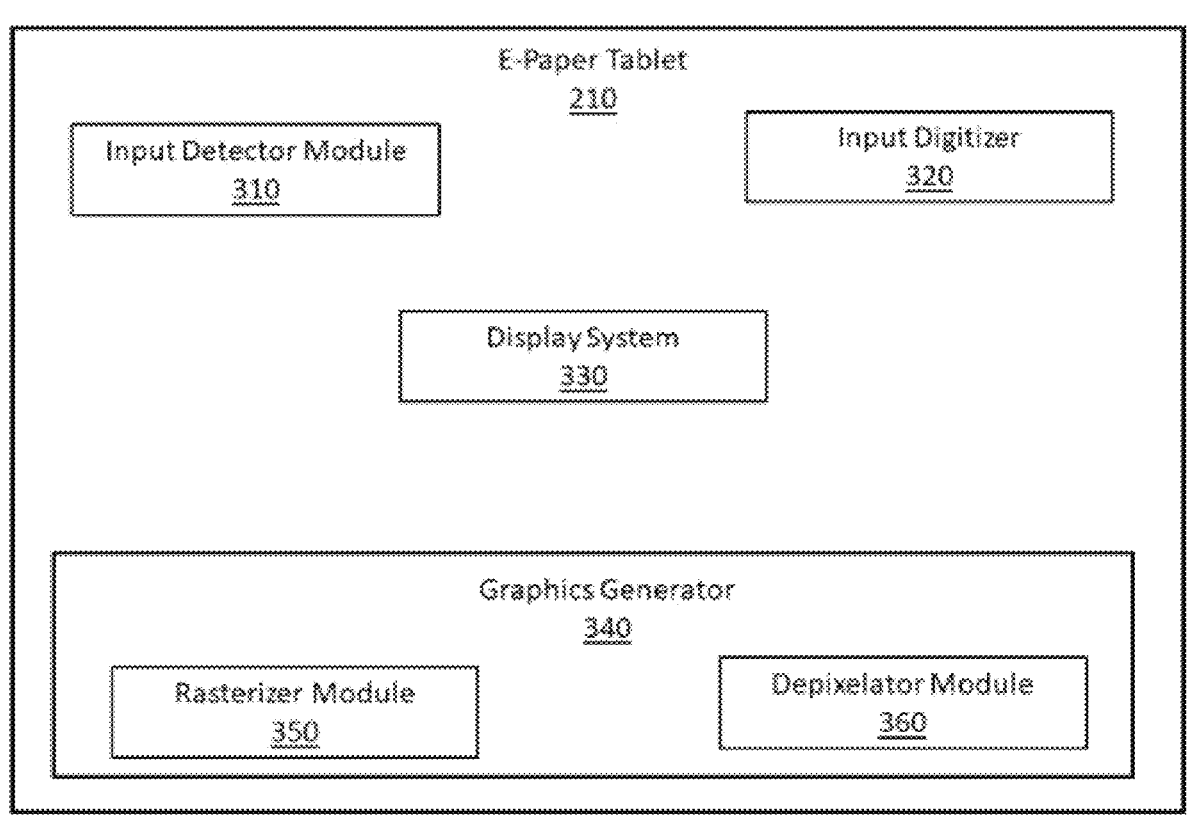
FIG. 3 is a block diagram of the system architecture of an e-paper tablet device 210, according to one example embodiment.

FIG. 3 is a block diagram of the system architecture of an e-paper tablet device 210, according to one example embodiment. In the embodiment illustrated in FIG. 3, the e-paper tablet device 210 comprises an input detector module 310, an input digitizer 320, a display system 330, and a graphics generator 340.

The input detector module 310 recognizes that a gesture has been or is being made on the screen of the e-paper tablet device 210. The input detector module 310 refers to electronics integrated into the screen of the e-paper tablet device 210 that are configured to interpret an encoded signal generated by contact between the input mechanism 220 and the screen into a recognizable gesture. To do so, the input detector module 310 may evaluate properties of the encoded signal to determine whether the signal represents a gesture made intentionally by a user or a gesture made unintentionally by a user.

The input digitizer 320 may be configured to convert the analog signal encoded by the contact between the input mechanism 220 and the screen into a digital set of instructions. The converted digital set of instructions may be processed by the e-paper tablet device 210 to generate or update a user interface displayed on the screen to reflect an intentional gesture.

The display system 330 may include the physical and firmware (or software) components to provide for display (e.g., render) on a screen a user interface. The user interface may correspond to any type of visual representation that may be presented to or viewed by a user of the e-paper tablet device 210.

Based on the digital signal generated by the input digitizer 320, the graphics generator 340 may be configured to generate or update graphics of a user interface to be displayed on the screen of the e-paper tablet device 210. The display system 330 may be configured to present those graphics of the user interface for display to a user using electronics integrated into the screen.

When an input mechanism 220 makes contact with a contact-sensitive screen of an e-paper tablet device 210, the input detector module 310 recognizes a gesture has been made through the screen. The gesture may be recognized as a part of an encoded signal generated by a pressure or force sensor in the input mechanism 220 and/or corresponding electronics of the screen of the display system 330. The encoded signal is transmitted to the input detector module 310, which evaluates properties of the encoded signal in view of at least one gesture rule to determine whether the gesture was made intentionally by a user. If the input detector module 310 determines that the gesture was made intentionally, the input detector module 310 communicates the encoded signal to the digitizer output. The encoded signal is an analog representation of the gesture received by a matrix of sensors embedded in the screen of the device 210.

In one example embodiment, the input digitizer 320 translates the physical points on the screen that the input mechanism 220 made contact with into a set of instructions for updating what is provided for display on the screen. For example, if the input detector module 310 detects an intentional gesture that swipes from a first page to a second page, the input digitizer 320 receives the analog signal generated by the input mechanism 220 as it performs the swiping gesture. The input digitizer 320 generates a digital signal for the swiping gesture that provides instructions for the display system 330 of the e-paper tablet device 210 to update the user interface of the screen to transition from, for example, a current (or first page) to a next (or second page, which may be before or after the first page).

In one example embodiment, the graphics generator 340 receives the digital instructional signal, such as a swipe gesture indicating page transition (e.g., flipping or turning) generated by the input digitizer 320. The graphics generator 340 generates graphics or an update to the previously displayed user interface graphics based on the received signal. The generated or updated graphics of the user interface are provided for display on the screen of the e-paper tablet device 210 by the display system 330, e.g., displaying a transition from a current page to a next page to a user. In the displayed embodiment of the FIG. 3, the graphics generator 340 comprises a rasterizer module 350 and a depixelator module 360. Input gestures drawn by a user on a contact-sensitive surface are received as vector graphics and are input to the rasterizer module 350. The rasterizer module 350 converts the input vector graphics to raster graphics, which can be displayed (or provided for display) on the contact-sensitive surface. The depixelator module 360 may apply image processing techniques to convert the displayed raster graphics back into vector graphics, for example to improve processing power of the e-paper tablet device 210 and to conserve memory of the e-paper tablet device 210. In at least one implementation, the depixelator module 360 may convert a displayed raster graphic back to a vector graphic when exporting content displayed on the screen into a different format or to a different system.

Further details about structures and functions of e-paper tablets and their graphical displays can be found in U.S. Pat. No. 11,158,097 to Martin Sandsmark and Gunnar Sletta entitled "Generating vector graphics by processing raster graphics" and in U.S. Pat. No. 10,824,274 to Sondre Hoff Dyvik, Martin Sandsmark, and Magnus Haug Wanberg, entitled "Interactive displays," both of which are incorporated by reference herein.

Figure 4:
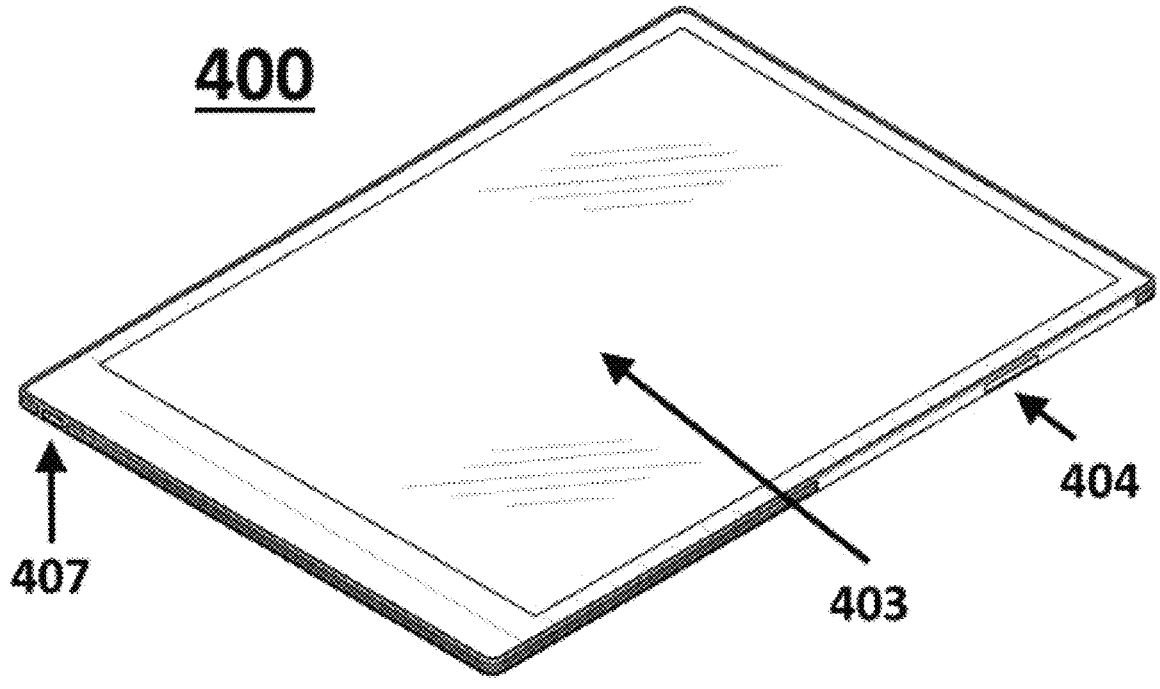
FIG. 4 illustrates a front and right perspective view of an e-paper tablet 400 having the functionality described for the e-paper tablet device 210 in FIGS. 2-3.

FIG. 4 illustrates a front and right perspective view of an e-paper tablet 400 having the functionality described for the e-paper tablet device 210 in FIGS. 2-3. Among other things, the e-paper tablet 400 includes a touch-sensitive display 403. The display 403 has been treated to provide a paper-feeling for users of the device when they engage with it using an input device 220. FIG. 4 also shows a charging area 404 for recharging the input device 220, when the input device is an active pen-stylus, according to an embodiment of the invention. Inside the e-paper tablet 400 near where the charging area 404 is located may be a set of magnets to hold the input device 220 in place while it is re-charging. FIG. 4 also shows a USB-c connector 407 that may be used to provide electrical power to the e-paper tablet 400, as well as transmitting various types of data into or out of the e-paper tablet 400. The e-paper tablet 400 also includes several actuators and other features that will be shown below in FIGS. 6-10.

Figure 5:
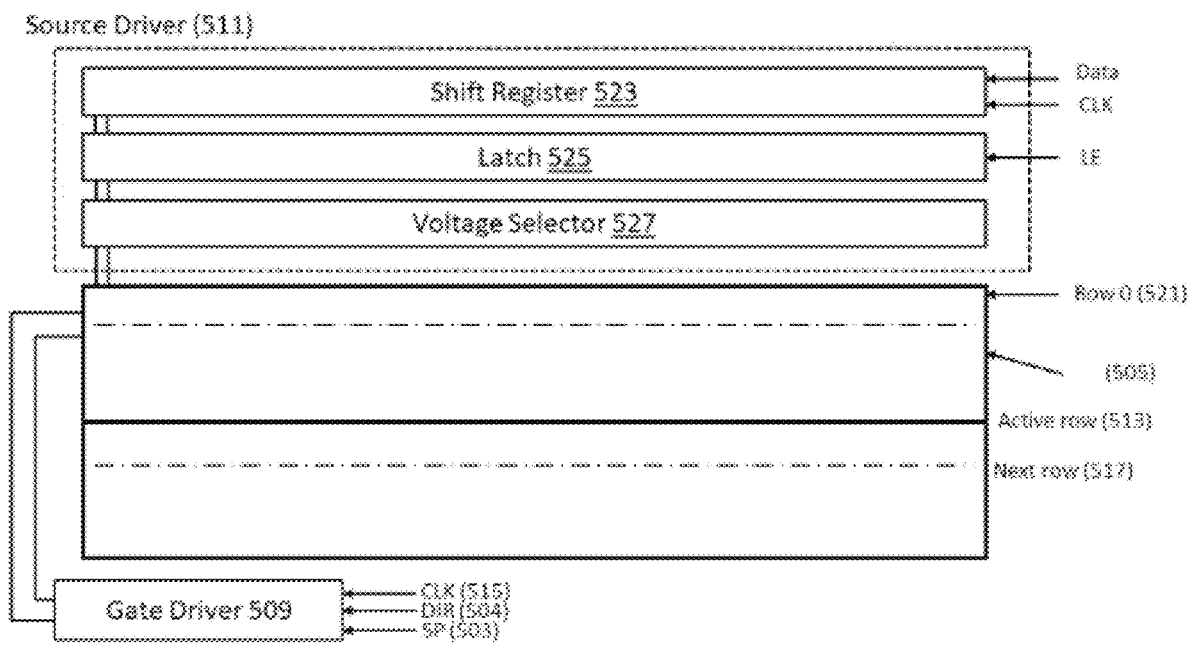
FIG. 5 illustrates hardware components of an example Electrophoretic Display (EPD) operating in an e-paper tablet device 210, according to one example embodiment.

FIG. 5 illustrates hardware components of an example Electrophoretic Display (EPD) in accordance with a disclosed embodiment. As discussed, a variety of display technologies may be employed, including EPDs, LCDs, and reflective LCDs (rLCDs). The specific display device deployed may be part of the display system 330 of the e-paper tablet device 210 shown in FIG. 3 and produce the images shown on the display 403 of the e-paper tablet 400 shown in FIG. 4. The EPD includes a gate driver 509, a source driver 511, a shift register 523 with data and clock signal line, a latch 525, a voltage selector 527, and rows making up a display 505. The EPD industry borrowed certain components and concepts from the LCD industry; however, these two devices have some fundamental differences as well. Of particular relevance here is the persistence of pixels in EPD displays. Unlike LCD displays, EPD displays do not require the frequent refreshing required in an LCD display. In an EPD display, once a neutral voltage is set for a pixel, the pixel will not change, for example, and will persist for a long period of time, especially relative to an LCD display.

As mentioned, Electrophoretic displays (EPDs) 505 have utilized many aspects of LCD production infrastructure and driving mechanisms. The driving electronics typically consist of a gate driver (GD) 509 and a source driver (SD) 511. The display 505 has multiple rows of pixels. Pixel values within a row may be changed, e.g., logic high voltage may be a "black" pixel and a logic low voltage or "ground" may be a no color pixel. The pixels in the EPD 505 function similarly to small capacitors that persist over long time intervals. An EPD pixel contains a large number of charged particles that are suspended in a liquid. If a charge is applied, the particles will move to a surface where they become visible. White and black particles have opposite charges such that a pixel's display may change from white to black by applying an opposite charge to the pixel. Thus, the waveforms applied to an EPD comprise long trains of voltages to change from black to white or vice versa. The EPD arts are also known to have the ability to apply variable voltage levels that mix the white and black particles to produce various shades of gray. Voltage levels in a pixel also may be tiered between to provide shades between no color and black (e.g., levels of grey). Groups of pixels around each other may form a region that provides some visible characteristic to a user, e.g., an image on a screen, e.g., of the display system 330 of the e-paper tablet device 210.

To change pixel values in a region, a scan of a display 505 will conventionally start at a top row, e.g., row 0 521, and apply voltages to update pixels within a particular row where pixels need to be changed to correspond with the image that is displayed. In this example, a start pulse (GDSP) 503 can be used to reset the driver 511 to row 0 521 and a direction (DIR) 504 can be used to reset a direction. A row-by-row selection is made by driving the driver gate 509 to select a row, e.g., active row 513. All pixels in one row are addressed concurrently using data transferred to the display. Latch 525 receives from the shift register 523 the next set of voltages to be applied to a row of pixels. When the scan of the active row is completed and, if necessary, pixels changed or updated, a clock pulse (GDCLK) 215 is issued to the driver gate 509 to change to the next row 517 for a scan.

As mentioned above, an ordinary artisan will recognize that a similar function can be accomplished also with a standard LCD, OLED, MicroLED or other type of display, and the description of EPD technology is provided here merely for illustration of one embodiment of the invention.

The source driver 511 is used to set the target voltage for each of the pixels/columns for the selected row. It consists of a shift register 523 for holding the voltage data, a latch circuit 525 for enabling pixel data transfer while the previous row is being exposed, and a voltage selector (multiplexer) 527 for converting the latched voltage selection into an actual voltage. For all rows to be updated all the voltage values have to be shifted into the register 523 and latched for the voltages to be available.

Figure 6:
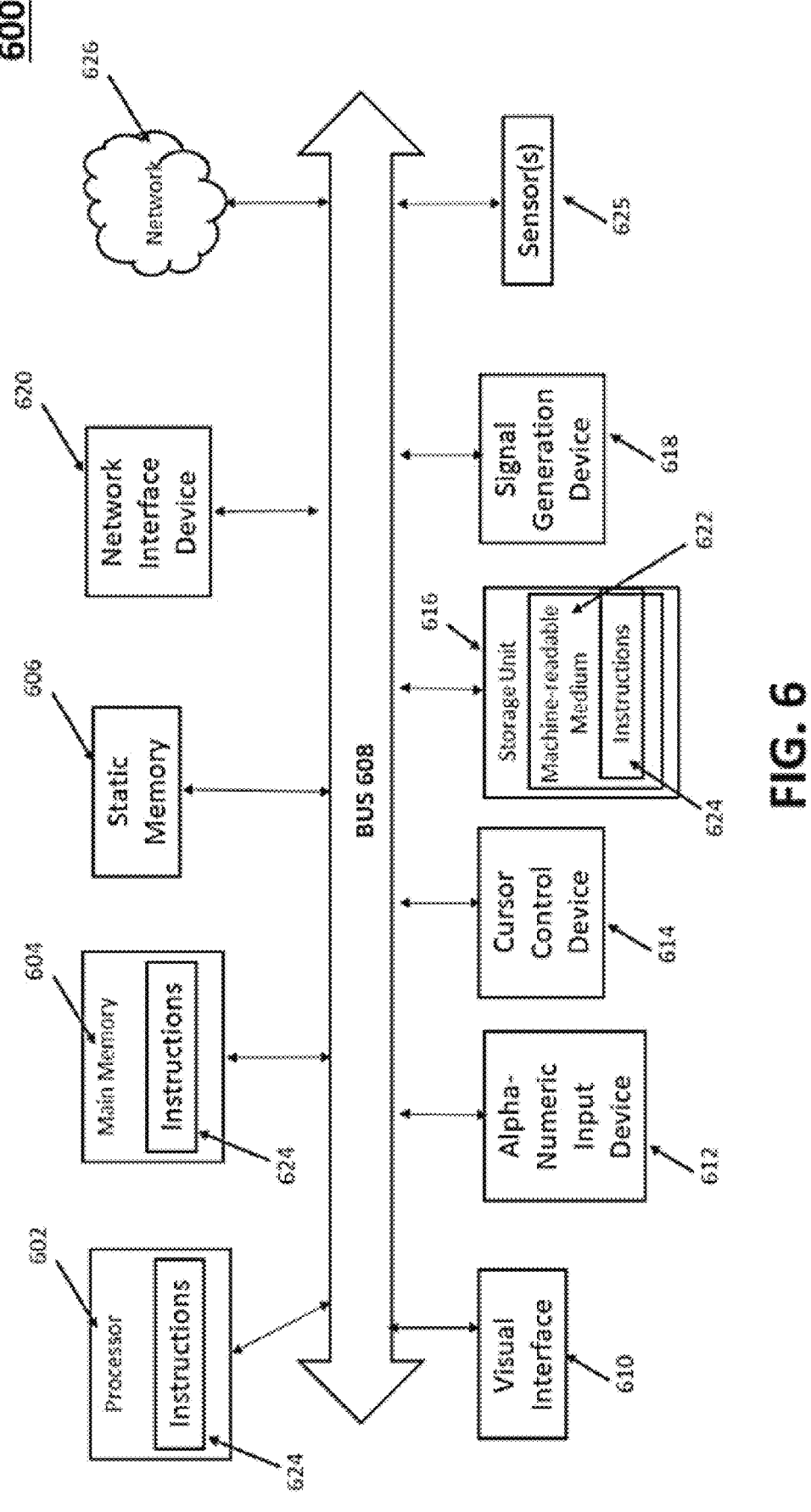
FIG. 6 is a block diagram illustrating components of an example machine able to read instructions from a machine-readable medium and execute them in a processor (or controller), according to one example embodiment.

FIG. 6 is a block diagram illustrating components of an example machine able to read instructions from a machine-readable medium and execute them in a processor (or controller), according to one embodiment. In this example, FIG. 6 shows a diagrammatic representation of a machine in the example form of a computer system 600 (e.g., the computing portions of the e-paper tablet 211 shown in FIG. 2) within which program code (e.g., software) for causing the machine to perform any one or more of the methodologies discussed herein may be executed. The e-paper tablet device 210 may include some or all of the components of the computer system 600. The program code may be comprised of instructions 624 executable by one or more processors 602. In the e-paper tablet system 210, the instructions may correspond to the functional components described in FIGS. 2, 3, and 5. FIG. 6 is an example of a processing system, of which a some of the described components or all of the described components may be leveraged by the modules described herein for execution.

While the embodiments described herein are in the context of the e-paper tablet system 210, it is noted that the principles may apply to other touch sensitive devices. In those contexts, the machine of FIG. 6 may be a server computer, a client computer, a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processors 602 (e.g., a central processing unit (CPU), one or more graphics processing units (GPU), one or more digital signal processors (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen or display screen. The visual interface 610 may include or may interface with a touch enabled screen, e.g., of the e-paper tablet system 210 and may be associated with the display system 330. The computer system 600 may also include an input device 612 (e.g., a pen-stylus, a keyboard, or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored (or encoded) instructions 624 (e.g., software) embodying any one or more of the methodologies or functions described herein. The instructions 624 (e.g., software) may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 (e.g., software) may be transmitted or received over a network 526 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

The computer system 600 also may include the one or more sensors 625. Also note that a computing device may include only a subset of the components illustrated and described with FIG. 6. For example, an IoT device may only include a processor 602, a small storage unit 616, a main memory 604, a visual interface 610, a network interface device 620, and a sensor 625.

Representative E-Paper Tablet

Figure 7:
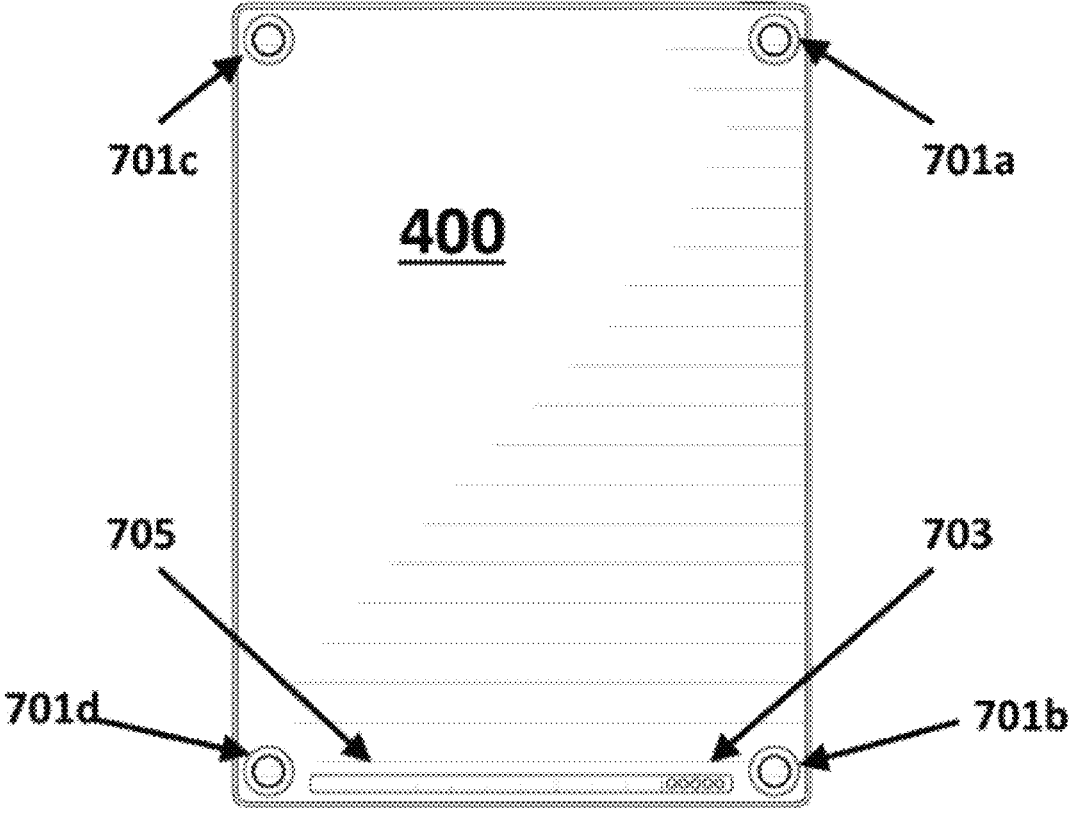
FIG. 7 illustrates a rear view of the e-paper tablet 400 showing volcano feet 701a-701d, a pogo pad 703, and a transceiver region 705, according to an embodiment of the invention.

FIG. 4 provided a representative view of an e-paper tablet 400, resembling the e-paper 210 shown in FIGS. 2-3. FIG. 7 illustrates a rear view of the e-paper tablet 400 showing volcano feet 701*a*-701*d*, a pogo pad 703, and a transceiver region 705, according to an embodiment of the invention. The transceiver region 705 resides outside and above the location for a main transceiver (e.g., an antenna on the e-paper tablet 110 that communicates with the cloud server 130 shown in FIG. 1) for the e-paper tablet 400, allowing the e-paper tablet device 400 to connect to the Internet, for example. The pogo pad 703 allows the e-paper tablet device 400 to connect to other devices, such as a folio device having a keyboard, for example.

Figure 8:
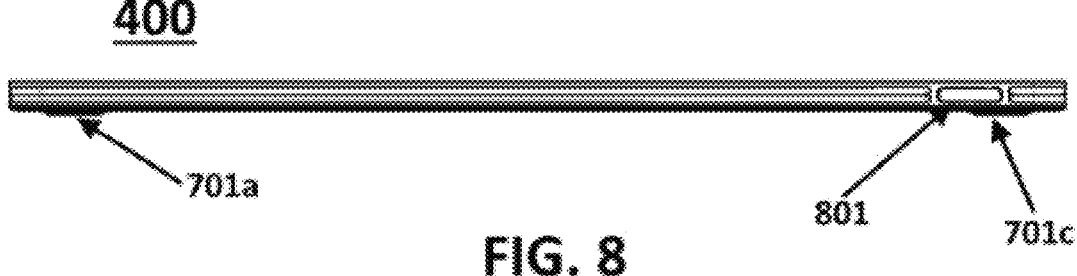
FIG. 8 illustrates a top view of the e-paper tablet device 400 showing volcano feet 701a, 701d, and a power button 801, according to an embodiment of the invention.

FIG. 8 illustrates a top view of the e-paper tablet device 400 showing volcano feet 701*a*, 701*d*, and a power button 801, according to an embodiment of the invention.

Figure 9:
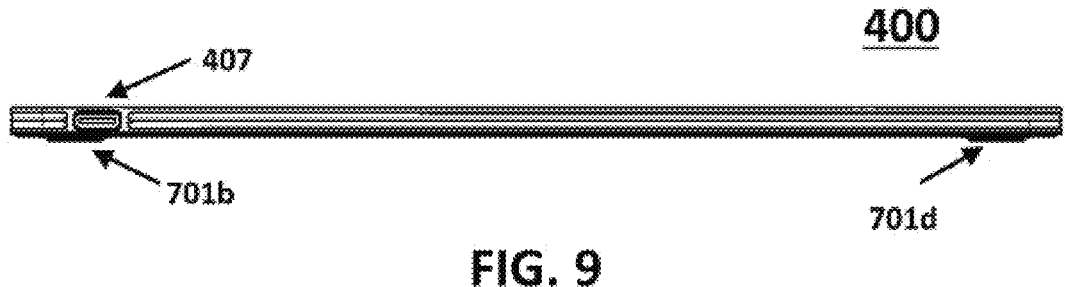
FIG. 9 illustrates a bottom view of the e-paper tablet device 400 showing volcano feet 701b, 701d and the USB-c connector 407, according to an embodiment of the invention.

FIG. 9 illustrates a bottom view of the e-paper tablet device 400 showing volcano feet 701*b*, 701*d* and the USB-c connector 407, according to an embodiment of the invention.

Figure 10:
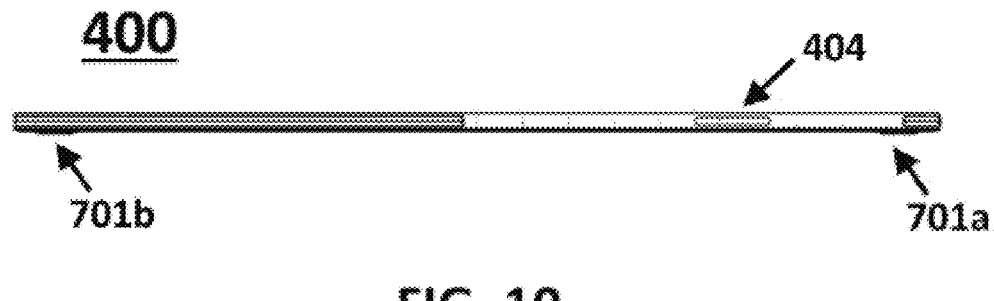
FIG. 10 illustrates a right view of the e-paper tablet device 400 showing volcano feet 701b, 701a, and the charging area 404 for recharging the input device 220, when the input device is an active pen-stylus, according to an embodiment of the invention.

FIG. 10 illustrates a right view of the e-paper tablet device 400 showing volcano feet 701*b*, 701*a*, and the charging area 404 for recharging the input device 220, when the input device is an active pen-stylus, according to an embodiment of the invention. Inside the e-paper tablet 400 near where the charging area 404 is located may be a set of magnets to hold the input device 220 in place while it is re-charging.

Figure 11:
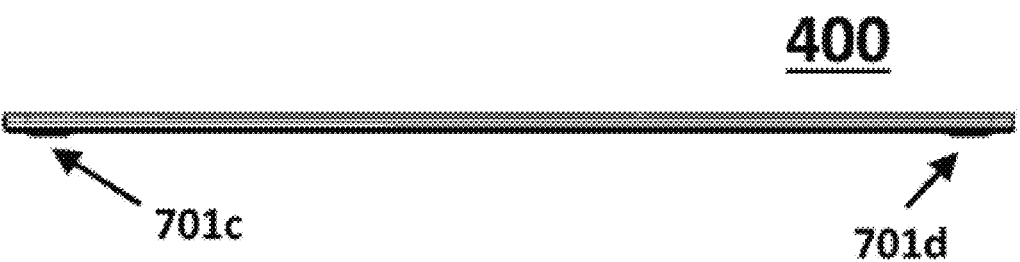
FIG. 11 illustrates a left view of the e-paper tablet device 400 showing volcano feet 701c, 701d, according to an embodiment of the invention.

FIG. 11 illustrates a left view of the e-paper tablet device 400 showing volcano feet 701*c*, 701*d*, according to an embodiment of the invention.

The Locking Mechanism for Thin Bezel and Repairability

The e-paper tablet device 210 may benefit from a locking mechanism that supplements and to some extent replaces the conventional approach for assembling tablet devices shown in FIG. 1, according to an embodiment of the invention. As discussed above, a tablet device, such as the e-paper tablet device 210 shown in FIG. 2, is typically manufactured in two halves (e.g., a front half 401*b* shown in FIG. 17 and a back half 401*a* shown in FIG. 12) that are then secured firmly together (e.g., to assemble the e-paper tablet 400 shown in FIG. 4) for rugged and durable use by consumers.

The conventional attachment mechanism comprises a thick band of adhesive tape that matches the width of the tablet device's bezel and a set of screws, typically applied at corners on the tablet device's rear. The application of adhesive tape typically requires a sufficiently wide area around the tablet device (e.g., the bezel 101 shown in FIG. 1) to which the adhesive tape may adhere. As discussed in connection with FIG. 1, this conventional approach essentially compels fairly wide bezel areas for tablet devices. Once applied (and possibly cured), the adhesive tape bonds the two halves (109*a*, 109*b*) of a conventional device so securely that the tablet device will often loses integrity as a working device if the two halves (109*a*, 109*b*) are once again separated, i.e., once broken apart the two halves (109*a*, 109*b*) of a conventional device cannot be put back together because the separation process essentially breaks the tablet device.

The screws that are also part of the conventional tablet assembly are often attached in locations not easily viewable by the user, such as underneath features like volcano feet (e.g., the volcano feet 701*a*-701*d* shown in FIG. 7). Unlike the adhesive tape, the screws can typically be removed with an appropriate tool. Unfortunately, screws alone do not typically apply sufficient force across all edges/openings of a tablet device to provide a strong bond comparable to the strong bond that adhesive tape provides.

Figure 12:
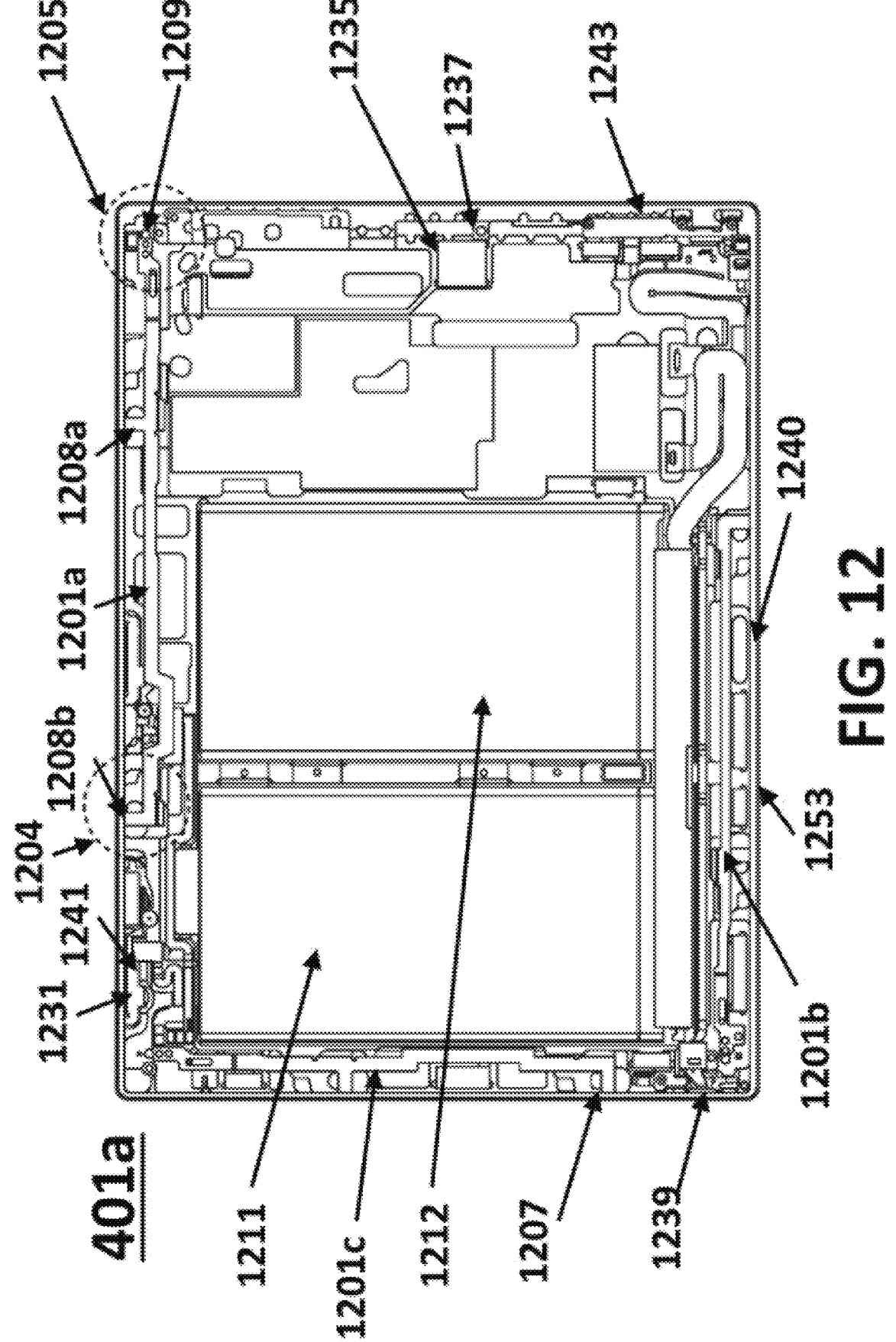
FIG. 12 illustrates a bottom half 401a of the e-paper tablet device 400 shown in FIG. 4 that includes three locking plates 1201a, 1201b, and 1201c, according to an embodiment of the invention.
Figure 17:
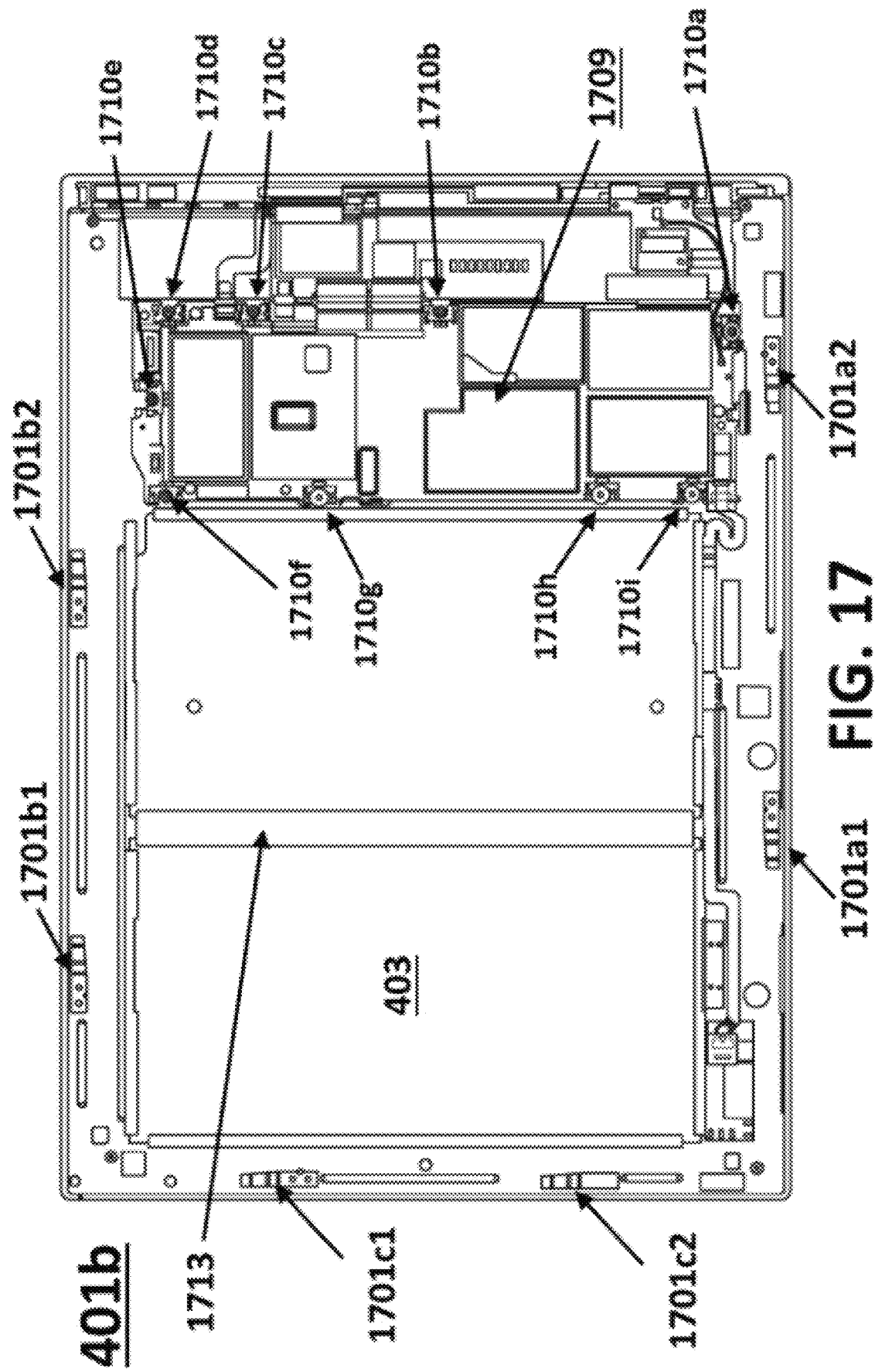
FIG. 17 illustrates a front or top half 401*b* of a tablet 400 showing locking spring locations 1701*a*1-1701*c*2, according to an embodiment of the invention.

Embodiments of the present invention provide a locking mechanism that supplements and to some extent replaces the conventional approach for assembling tablet devices shown in FIG. 1. Embodiments of the locking mechanism will be described with respect to the bottom half 401*a* of the tablet 400 shown in FIG. 4 and the top half 401*b* of the tablet 400 shown in FIG. 4. Accordingly, FIG. 12 and FIG. 17 illustrates two halves 401*a* and 401*b*, respectively of the e-paper tablet device 400 including the locking plates 1201*a*-1201*c* shown in FIG. 12, according to an embodiment of the invention. The locking plates 1201*a*-1201*c* form key components of the locking mechanism for holding the device halves 401*a*, 401*b* tightly together with the need to apply the conventional layer of thick adhesive. Of course, the electronic and mechanical components assembled in the two halves 401*a*, 401*b* may vary in various embodiments of the tablet 400.

FIG. 12 illustrates a bottom half 401*a* of the e-paper tablet device 400 shown in FIG. 4 that includes three locking plates 1201*a*, 1201*b*, and 1201*c*, according to an embodiment of the invention. The three locking plates 1201*a*, 1201*b*, and 1201*c* each run along one side of three sides of the bottom half 401*a* and allow bezel 1207 to be thinner (or narrower) than the bezel 101 shown in FIG. 1 because some measure of the strength of the connection along the edges of the sealed tablet 400 is handled by the locking plates 1201*a*, 1201*b*, and 1201*c* rather than thick adhesive tape acting alone or in conjunction with a set of screws inserted into the device's feet. The locking plates 1201*a*-1201*c* include at least one upper locking tab (e.g., the upper locking tabs 1208*a*, 1208*b* for locking plate 1201*a*) that binds the bottom half 401*a* to the upper half 401*b* when engaged by sliding into a counterpart locking spring (e.g., the upper locking tab 1208*a* sliding into the locking spring 1701*a*2 shown in FIG. 17 and FIG. 22*c*), according to an embodiment of the invention. As shown herein, the lock and spring mechanism has three states: open, partial lock, and locked. In some embodiments of the invention, the partial lock state may simply arise as a temporary state from open to locked. The state shown in FIG. 12 represents an open state for the locking mechanism in the bottom half 401*a*, according to an embodiment of the invention.

A locking plate is not provided along the side of the tablet 401*a* that includes the transceiver 1235 (that matches the transceiver region 705 shown in FIG. 7) and the pogo pads 1243 (that matches the pogo pads 703 shown in FIG. 7) to avoid electrical interference, particularly with respect to signals to/from the transceiver 1235. Embodiments of the locking plates 1201*a*-1201*c* may be constructed from a metallic material, e.g., aluminum. Of course, in some embodiments of the invention, the locking plates 1201*a*-1201*c* could be comprised of a strong material that does not cause electrical interference, and in which cases a fourth locking mechanism could be employed.

For side(s) of the tablet device 400 where the locking plates 1201*a*-1201*c* cannot be employed, the adhesive material (and the bezel 1207) may be increased in width if desired. Alternatively, the thinner adhesive enabled by the locking plates 1201*a*-1201*c* may be sufficient if only a small region (e.g., a single side) is exposed.

Regions 1204 and 1205 respectively illustrate distal and proximal ends of the locking plate 1201*a* with respect to a hole 1209 that passes through to the backside of the tablet 400 and resides underneath a volcano foot (e.g., volcano foot 701*d* shown in FIG. 7). The external hole 1209 has counterparts in locking plates 1201*b* and 1201*c*. The region 1204 is depicted in closer detail in FIGS. 13A and 13B, and the region 1205 is depicted in closer detail in FIGS. 14A and 14B.

Figure 15:
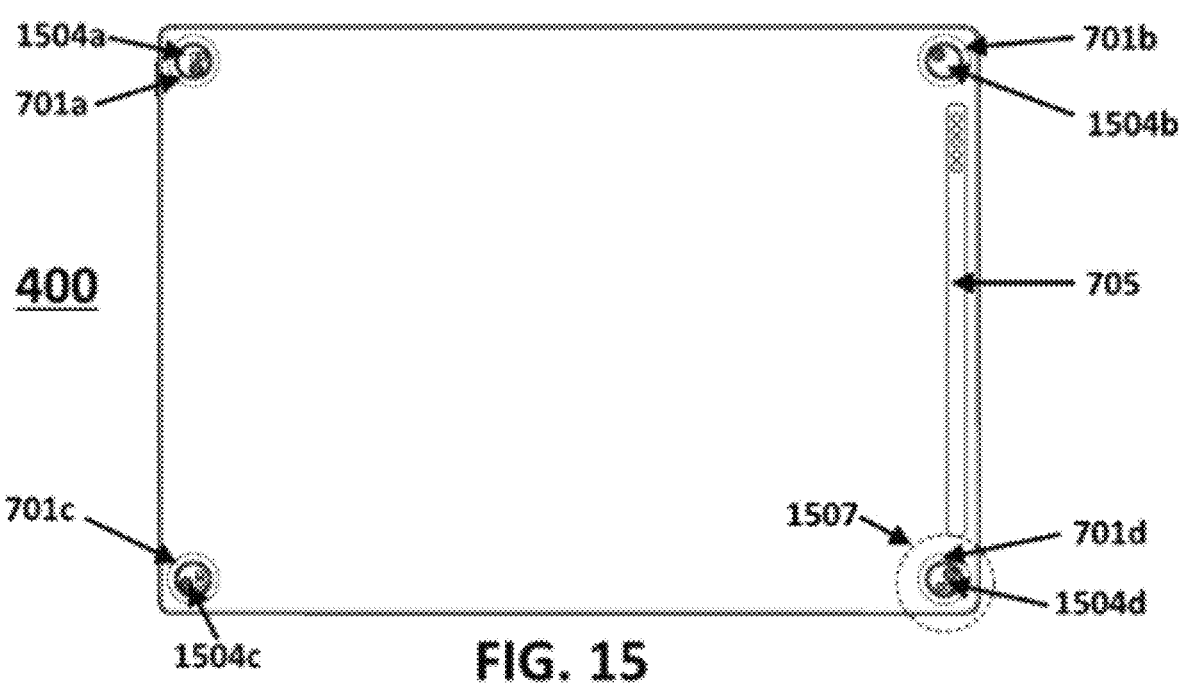
FIG. 15 illustrates a rear side of the tablet 400 similar to FIG. 7 but with the plastic covers of the volcano feet 701*a*-701*d* removed to show outer latches 1504*a*-1504*d* in an open position.

The locking plates 1201*a*-1201*c* may be unlocked by employing a tool, possibly a specialized tool, into the hole 1209 (or hole 1209) located underneath the four volcano feet 701*a*-701*d* shown in FIG. 7 on the bottom side of the e-paper tablet 400 (see, also, e.g., FIG. 15). So, for example, when the three locking plates 1201*a*-1201*c* are present, then three of the volcano feet (e.g., 701*a*, 701*c*, and 701*d*) include the hole 1209 for the underlying locking plates 1201*a*-1201*c* and the fourth volcano foot (701*b*) includes simpler lock that just locks down its respective corner of the e-paper tablet 400.

The presence of the locking plates 1201*a*-1201*c* may also simplify repairability of the e-paper tablet device 400. When a thick adhesive layer is applied to a wide bezel in a conventional tablet (e.g., the tablet 100 shown in FIG. 1), the tablet cannot normally be opened without damaging the tablet device. In contrast, when the locking plates 1201*a*-1201*c* are employed, then the e-paper tablet device 400 should be easier to repair. The locking plates 1201*a*-1201*c* can simply be unlocked, and then the thinner adhesive layer may be removed, opening the two halves (e.g., 401*a* shown in FIGS. 12 and 401*b* shown in FIG. 17) of the e-paper tablet 400 and enabling repair. Depending on the type of adhesive employed, it may be necessary, for example, to apply a small amount of heat to loosen the adhesive.

The locking plates 1201*a*-1201*c* described herein offer several advantages over conventional designs, including easing the ability to repair the e-paper tablet 400 shown in FIG. 4. A consumer right to repair electronic devices is becoming increasingly common (e.g., the "Proposal for a Directive of the European Parliament and of the Council on common rules promoting the repair of goods and amending Regulation (EU) 2017/2394, Directives (EU) 2019/771 and (EU) 2020/1828"). The locking plates 1201*a*-1201*c* enable consumers to repair and/or have their e-paper tablet devices 200 repaired.

As a practical matter, many consumers may wish to take broken e-paper tablet devices to repair shops rather than performing the repairs themselves, although self-repair is also a possibility. When the e-paper tablet device 400 is opened, the adhesive is typically destroyed or rendered inoperable in the process. Consequently, new adhesive will likely be needed to reassemble a repaired tablet device 400.

Similarly, a consumer's ability to open the e-paper tablet device 400 also allows the consumer to replace components within the e-paper tablet device 400 without having to buy a new e-paper tablet device. So, for example, if a consumer desires more powerful electrical components or memory than the electrical components or memory with which the e-paper tablet device 400 was sold, then the consumer could theoretically purchase more powerful electrical components or memory and replace the electrical components or memory in the tablet 400 with upgraded components or memory, so long as the size of the new components or memory and their power characteristics were compatible with the other components of the e-paper tablet device 400, according to an embodiment of the invention. While a consumer could might want to replace any of the electrical components, the electrical component most likely to be replaced would be the PCBA, e.g., the PCB 1709 shown in FIG. 17. Similarly, and possibly more likely, a consumer might want to replace one of the battery cells 1211, 1212 with a newer cell, which becomes possible when the tablet 400 is not destroyed by opening it.

As shown in FIG. 12, the bottom half 401*a* contains a battery having two cells 1211, 1212, power elements 1231 (that match the exterior power button 801 shown in FIG. 8, a transceiver 1235, USB-c components 1239 (that match the USB-c connector 407 shown in FIG. 9, and a charging mechanism 1253 for a pen-stylus marker device (that matches the charging area 404 shown in FIG. 4).

Various components within the e-paper tablet device 400 may be attached within the e-paper tablet device 400 in ways to enable repairability. For example, the transceiver 1235 may be attached to the e-paper tablet device 400 via removable clip 1237. Likewise, the power elements 1231 may be attached via a removeable clip 1241. The charging mechanism 1253 for the marker may also be attached via a clip 1240. Each battery cell 1211, 1212 of the battery may also be replaced.

Figures 13A, 13B:
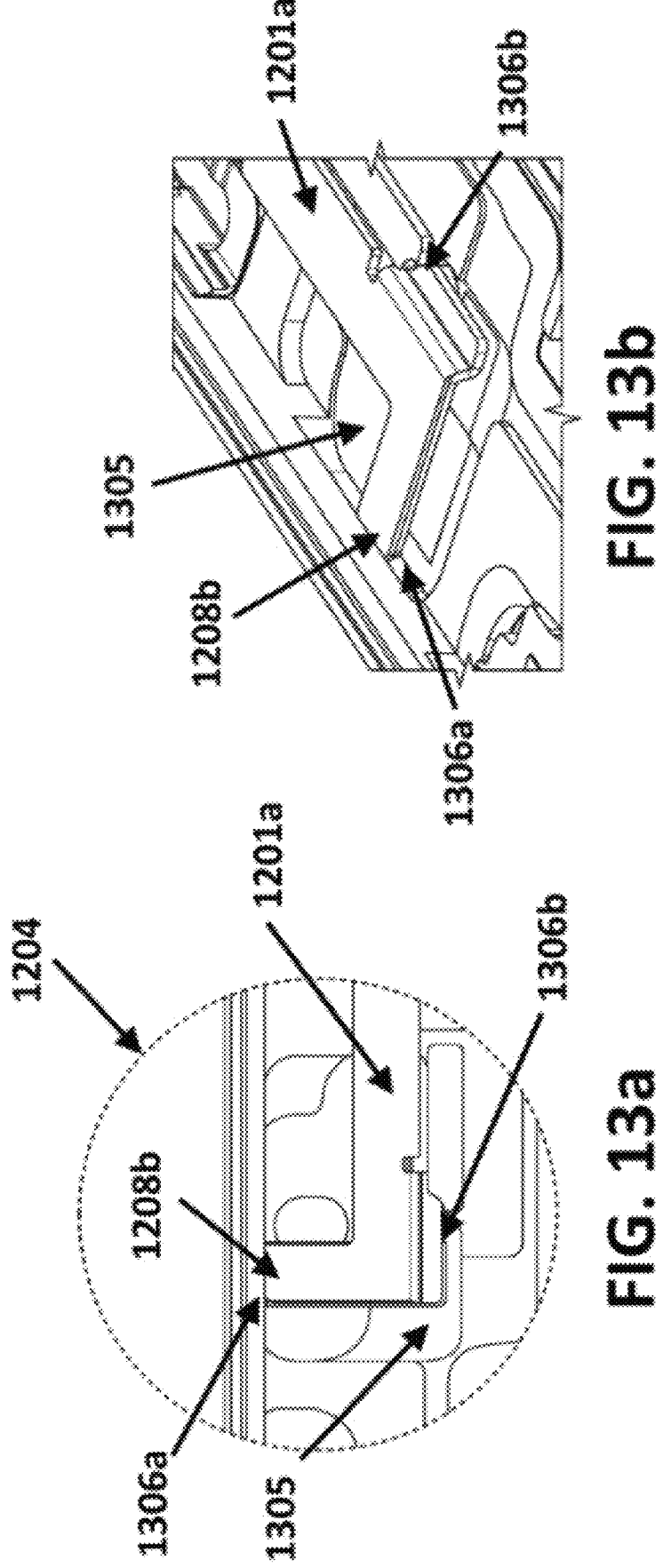
FIGS. 13A and 13B illustrate a close up detail 1204 of a terminal end of a locking plate 1201a with the upper locking tab 1208b in an open position and engaged with undercut features 1306a, 1306b that hold the locking plate 1201a to the back half 401a in a manner that allows the locking plate 1201a to slide between opened and locked positions.

FIGS. 13A and 13B illustrate a close up detail 1204 of a terminal end of a locking plate 1201*a* with the upper locking tab 1208*b* in an open position and engaged with undercut features 1306*a*, 1306*b* that hold the locking plate 1201*a* to the back half 401*a* in a manner that allows the locking plate 1201*a* to slide between opened and locked positions. The locking plate 1201*a* is held in place against these undercuts 1306*a*, 1306*b* with foam pads 1305 that facilitate sliding the locking plate 1201*a* between open and locked positions, according to an embodiment of the invention.

Figures 14A, 14B:
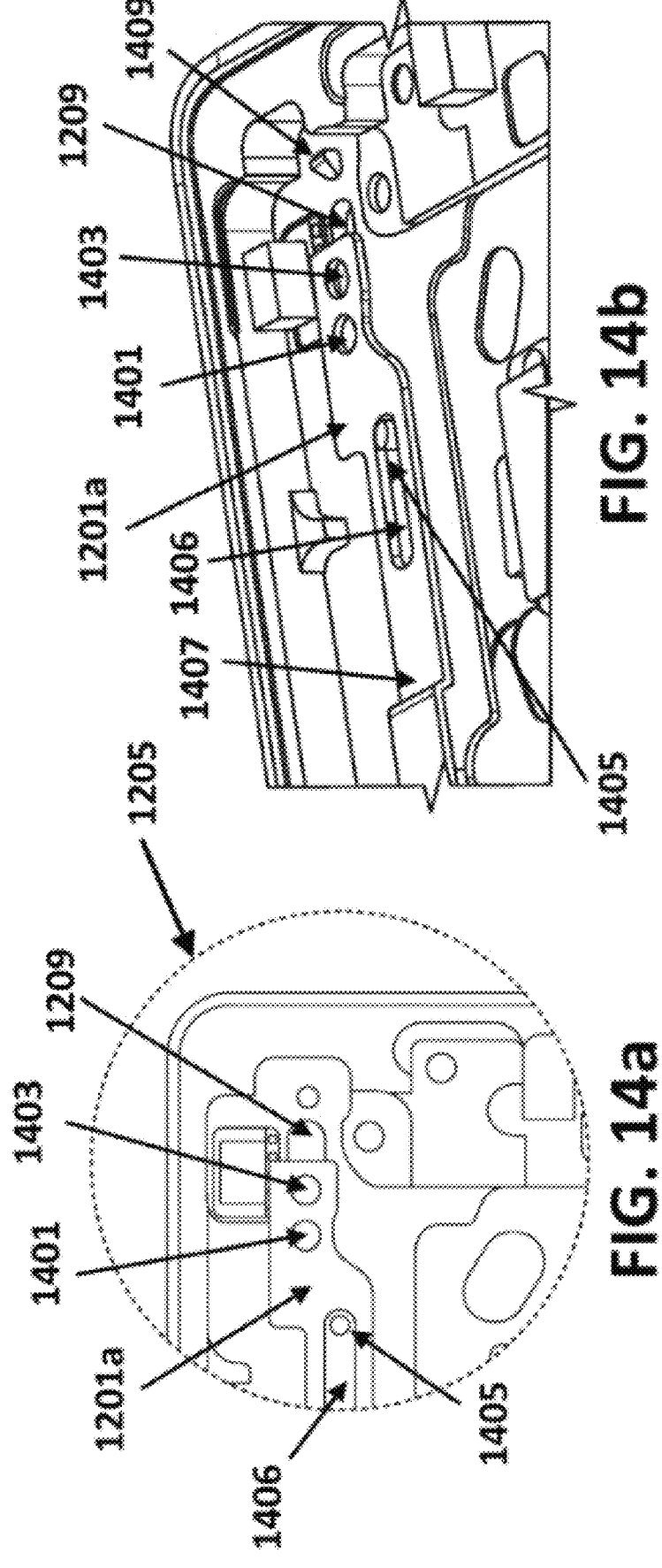
FIGS. 14A and 14B illustrate a close up detail 1205 shown in FIG. 12 of a locking end of the locking plate 1201a at the opposite end of the locking plate detail shown in FIGS. 13A and 13B.

FIGS. 14A and 14B illustrate a close up detail 1205 shown in FIG. 12 of a locking end of the locking plate 1201*a* at the opposite end of the locking plate detail shown in FIGS. 13A and 13B. The locking plate 1201*a* is shown in an open position and includes an alignment tab 1405 in a slot 1406 on the locking plate 1201*a* that: 1) prevents the locking plate 1201*a* from becoming loose during handling, 2) centers an alignment hole 1403 over the hole 1209 which passes through to the backside of the tablet back half 404*a*. A bend 1407 in the locking plate 1201*a* employs spring force to maintain stability during the assembly and disassembly operation and may also provide force to the hole 1209 into locked position which will place alignment hole 1403 over locking post 1409.

FIG. 15 illustrates a rear side of the tablet 400 similar to FIG. 7 but with the plastic covers of the volcano feet 701*a*-701*d* removed to show outer latches 1504*a*-1504*d* in an open position. The outer latch 1504*d* aligns with the hole 1209 shown in FIG. 12. Outer latches 1504*a* and 1504*c* have similar holes to the hole 1209. A region 1507 that includes the outer latch 1504*d* is shown in closer detail in FIG. 16.

Figure 16:
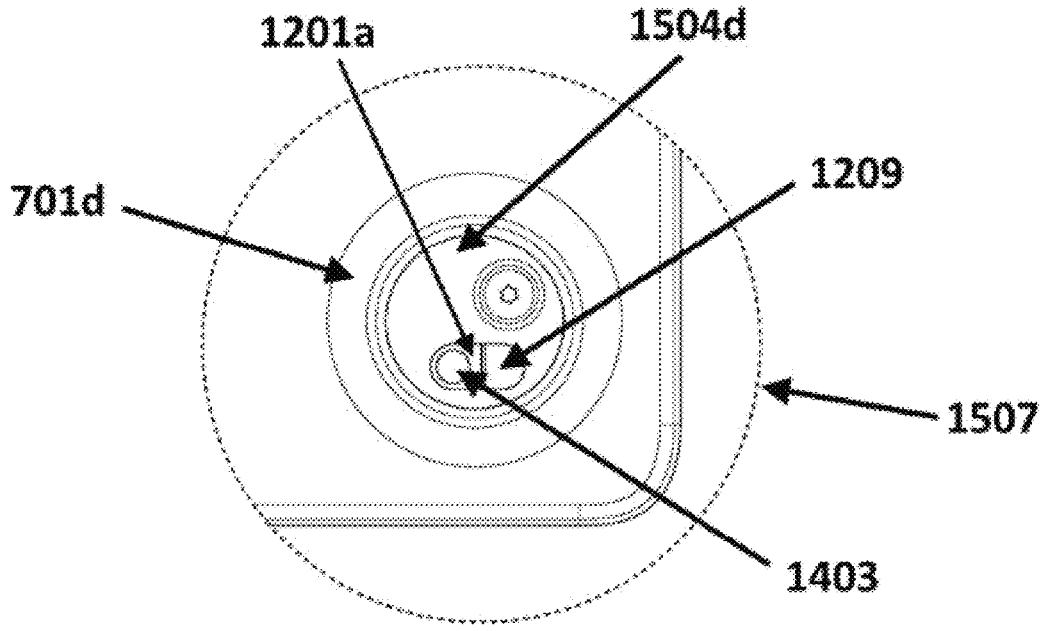
FIG. 16 provides a close-up view of a volcano foot 701*d* and its outer latch 1504*d* from the region 1507 shown in FIG. 15, according to an embodiment of the invention.

FIG. 16 provides a close-up view of a volcano foot 701*d* and its outer latch 1504*d* from the region 1507 shown in FIG. 15, according to an embodiment of the invention. The outer latch 1504*d* is shown in an open position and comprises an opposite side view of the alignment hole 1403 in the locking plate 1201*a* shown in FIGS. 14A and 14B. Likewise, the hole 1209 is shown from the opposite side shown in FIGS. 14A and 14B. As shown in FIG. 16, the outer latch 1504*d* is shown in an open position. An operator or repair technician may employ a simple tool inserted into the alignment hole 1403 to drag the locking plate 1201*a* into partial locked and locked configurations, such as the partial locked configuration shown in FIGS. 20A and 20B and the locked configuration shown in FIGS. 22*a*-22*c*. For example, an operator may place a tool into the alignment hole 1403 and drag the locking plate 1201*a* into a locked position.

Similarly, when the locking plate 1201*a* is in a locked position, the operator may push the locking plate 1201*a* back into an open position and then begin to open the tablet 400 (if so desired).

Figures 19A, 19B:
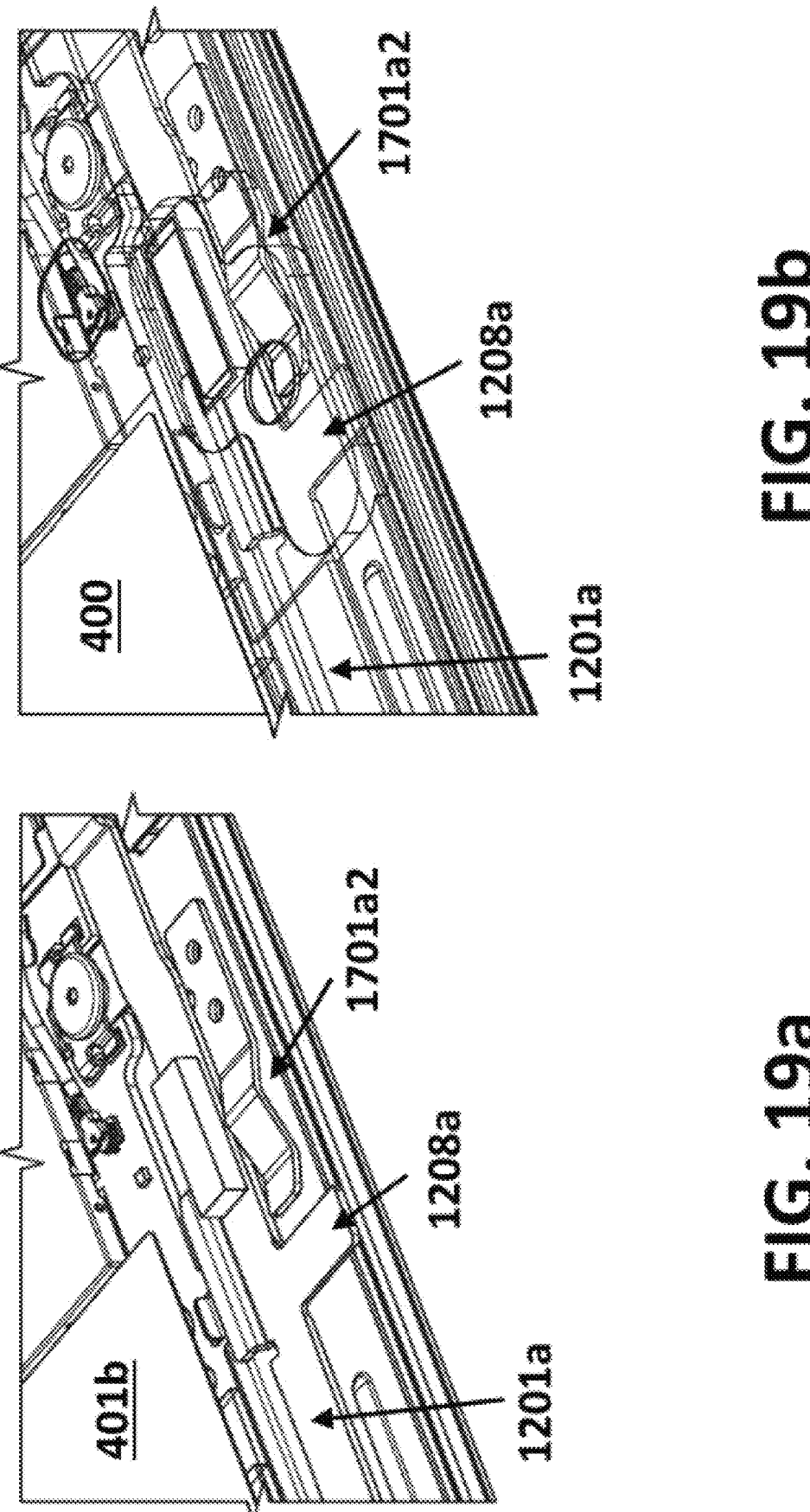
FIG. 19A illustrates a portion of the top half 401*b* showing a locking spring 1701*a*2 attached to the top half 401*b*, according to an embodiment of the invention.
FIG. 19B illustrates a portion of the tablet 401 have a top half 401*b* and a bottom half 401*a*.

FIG. 17 illustrates a front or top half 401*b* of a tablet 400 showing locking spring locations 1701*a*1-1701*c*2, according to an embodiment of the invention. As discussed herein, each of the locking springs matches with a locking tab (e.g., as shown in FIG. 19*a*, locking spring 1701*a*2 pairs with upper locking tab 1208*a*).

As shown in FIG. 17, the top half 401*b* contains a printed circuit board (PCB) 1709 containing various electronic components and the display 403 held within a chassis 1713. As discussed above, the display 403 may be an electrophoretic display (EPD) and such displays (unlike LCD displays) are typically glued into tablet devices and not held within a container like the chassis 1713 that is attached to the e-paper tablet device 400. Display components accompanying the display 403 may include a touch display module to enable users via a pen-stylus marker to interact with the e-paper tablet device 400.

As shown in FIG. 17, the display components 403 may be attached via a special chassis 1713 that enables removal of the display components 403. EPD displays are conventionally glued into tablets and not amenable to repair. The chassis 1713 may be screwed into the e-paper tablet device 400 and replaced by simply removing the screws 1710*a*-1710*i*. Likewise, the PCB 1709 may be replaced by removing the screws that hold it in. The display components 403 may also include a double-sided tape that helps stick the two halves 400*a*, 400*b* together, although quite possibly not tightly enough to hold the two halves together without the locking mechanism.

Figure 18:
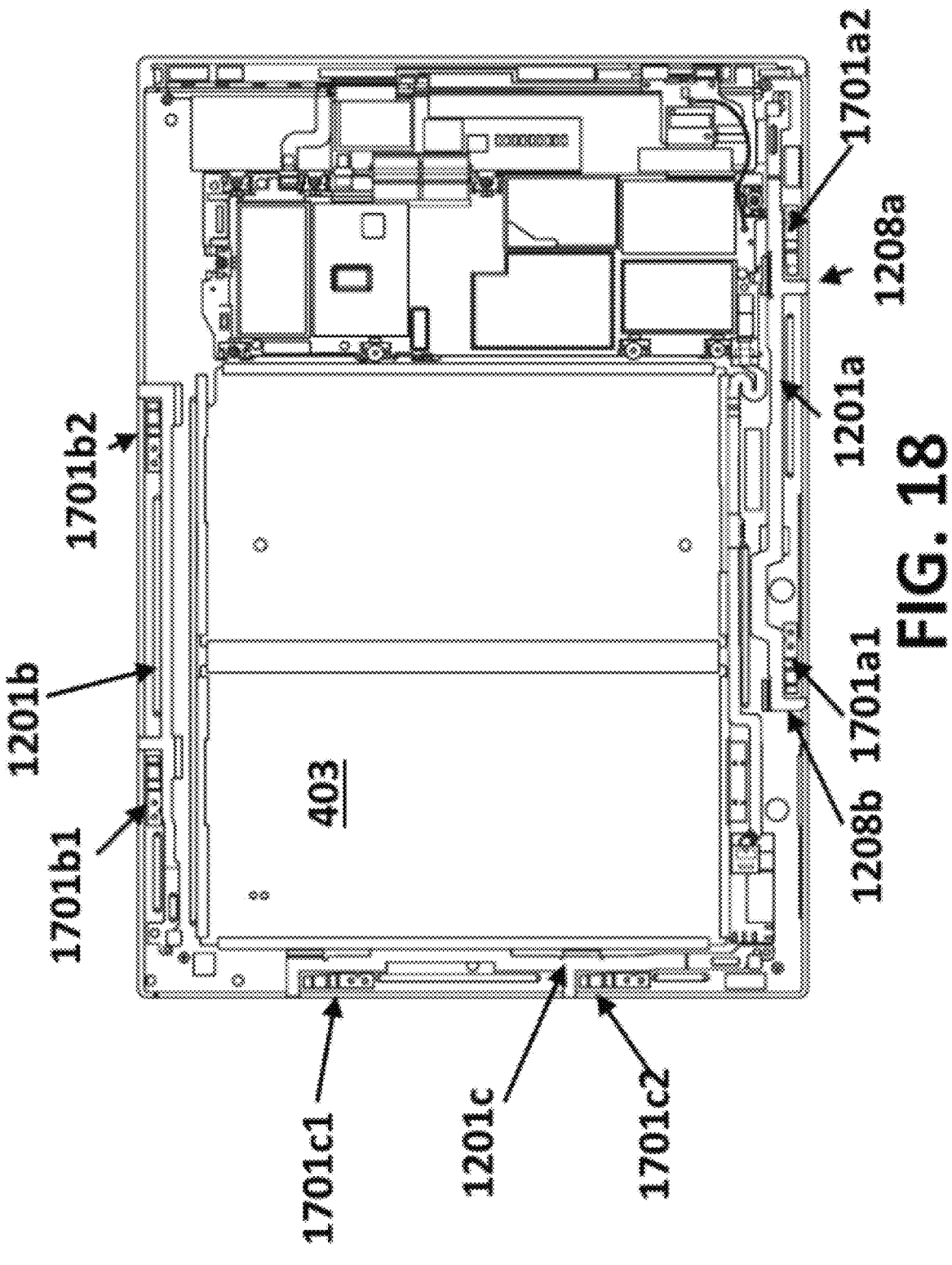
FIG. 18 shows the top half 401*b* depicted along with the locking plates 1201*a*-1201*c* from the bottom half 401*a*, according to an embodiment of the invention.

FIG. 18 shows the top half 401*b* depicted along with the locking plates 1201*a*-1201*c* from the bottom half 401*a*, according to an embodiment of the invention. The locking plates 1201*a*-1201*c* are shown in an open position in FIG. 18. As shown in FIG. 12, the locking plates 1201*a*-1201*c* are fastened to the bottom half 401*a*, but locking the two halves 400*a*, 400*b* of the tablet 400 together necessitates sliding the locking plates 1201*a*-1201*c* into a position such that an upper locking tab (e.g., the upper locking tab 1208*a*) engages with a corresponding locking spring (e.g., locking spring 1701*a*2 shown in FIGS. 17 and 19) on the top half 401*b*. Unless moved to the locked position, the locking plates 1201*a*-1201*c* would not fasten the top half 401*b* with the bottom half 401*a*.

FIG. 19A illustrates a portion of the top half 401*b* showing a locking spring 1701*a*2 attached to the top half 401*b*, according to an embodiment of the invention. FIG. 19A also shows the locking plate 1201*b* in an open position with respect to upper locking tab 1208*a* and the locking spring 1701*a*2. In a locked position, the upper locking tab 1208*a* of the locking plate 1201*a* slides underneath the locking spring 1701*a*2, binding the locking plate 1201*a* tightly to the locking spring 1701*a*. While not shown in FIG. 19*a*, the corresponding locking plates 1201*a*, 1201*c* likewise have counterpart upper locking tabs that engage with counterpart locking springs that are themselves attached to the top half 401*b*.

FIG. 19B illustrates a portion of the tablet 401 have a top half 401*b* and a bottom half 401*a*, according to an embodiment of the invention. Much of the bottom half 401*a* is depicted in outline. FIG. 19B otherwise resembles FIG. 19B and shows the locking plate 1201*a* in an open position with respect to the locking spring 1701*a*2, according to an embodiment of the invention.

Figures 20A, 20B:
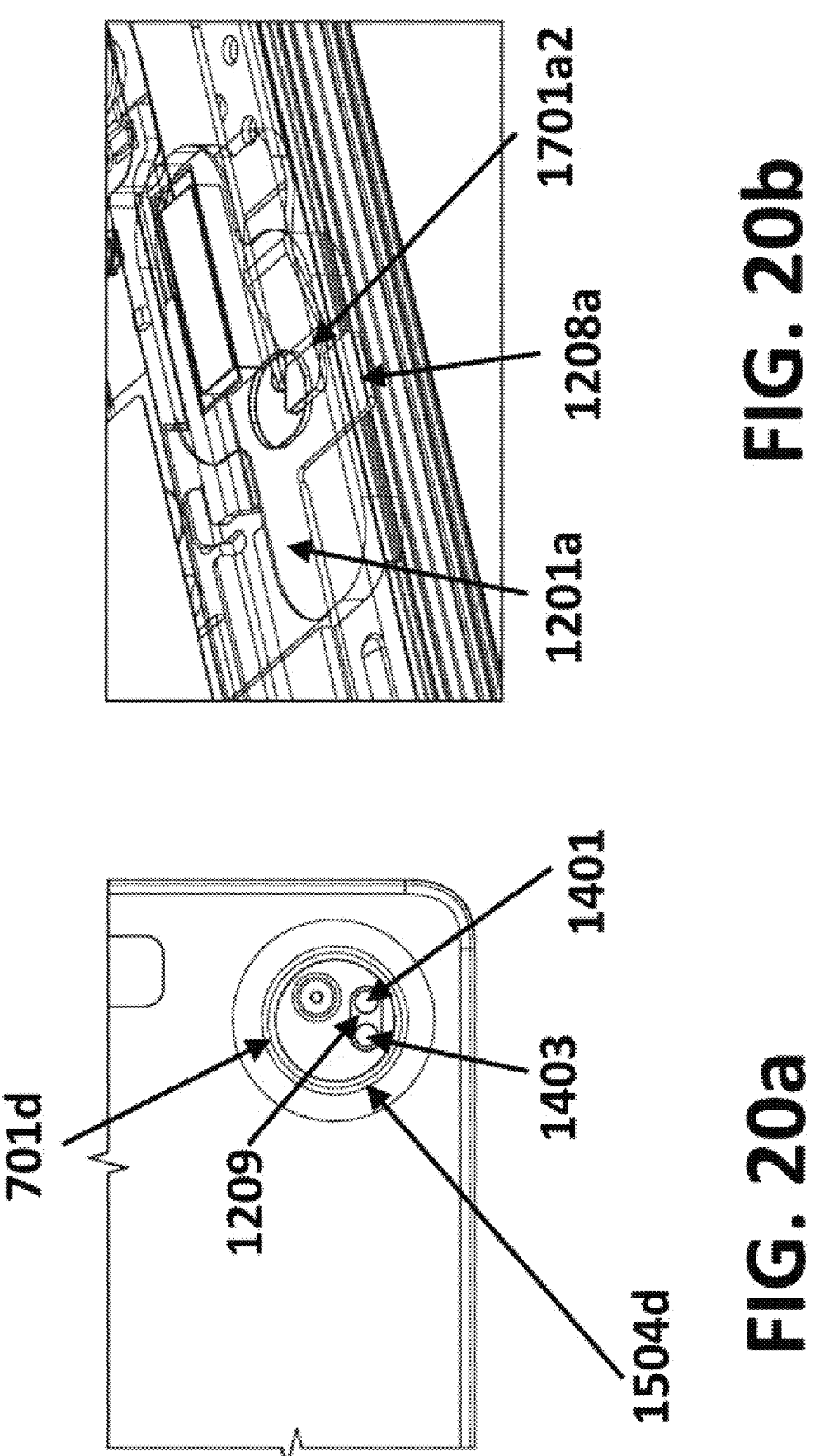
FIGS. 20A and 20B respectively illustrate the locking plate 1201*a* pulled into a partial lock position, where the upper locking tab 1208*a* begins sliding into the locking spring 1701*a*2, according to an embodiment of the invention.

FIGS. 20A and 20B respectively illustrate the locking plate 1201*a* pulled into a partial lock position, where the upper locking tab 1208*a* begins sliding into the locking spring 1701*a*2, according to an embodiment of the invention. FIG. 20A resembles FIG. 16, except that in the partial lock position, both alignment hole 1403 and alignment hole 1401 of the locking plate 1201*b* are visible through the hole 1209. FIG. 20B resembles FIG. 19B, except that the upper locking tab 1208*a* of locking plate 1201*a* has now been pulled into the locking spring 1701*a*. Once all the locking plates 1201*a*-1201*c* have been pulled into the partial lock position, then bottom half 401*a* and the top half 401*b* of the tablet 400 will begin to be linked together.

In some embodiments of the invention, the partial lock position may enable a smaller size alignment hole (e.g., the alignment hole 1403) and a smaller size locking post (e.g., the locking post 1409) than would be needed if only two states (unlocked and locked) were employed. Among other things, the locking post 1409 may also help secure the locking mechanism from coming undone if the tablet 400 receives a shock (e.g., being dropped) after the two halves 400*a*, 400*b* are locked together, e.g., the post prevents the locking mechanism from accidentally sliding into an open position.

In an alternative embodiment of the invention, the partial lock position could be employed to enable the partial removal of a cover plate, e.g., a cover that only covered over a portion (e.g., half) of the bottom half 401*a* of the tablet 400.

Figure 21:
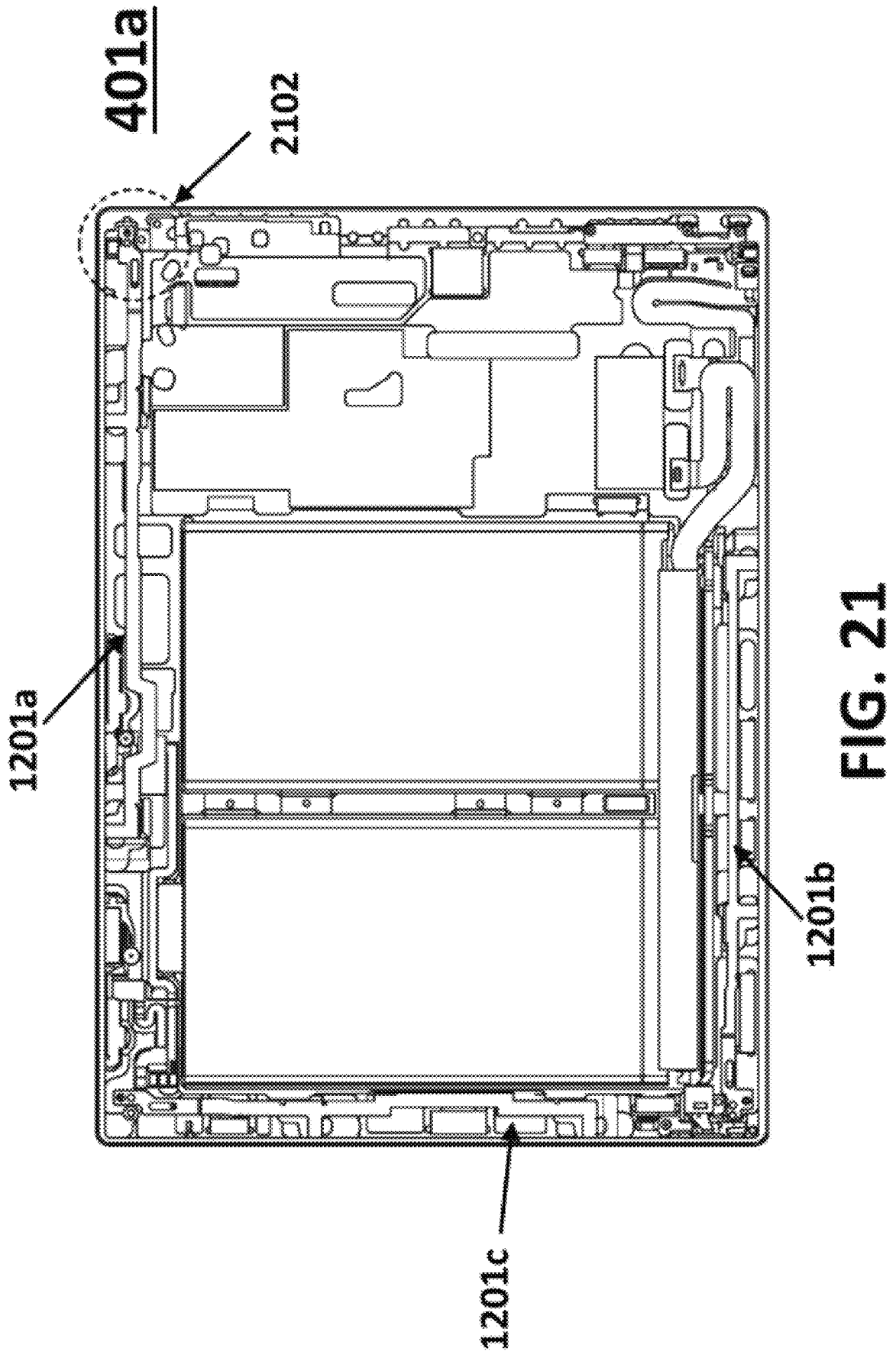
FIG. 21 illustrates a bottom half 401*a* of the tablet 400 showing the locking plates 1201*a*-1201*c* in a locked position, according to an embodiment of the invention.

FIG. 21 illustrates a bottom half 401*a* of the tablet 400 showing the locking plates 1201*a*-1201*c* in a locked position, according to an embodiment of the invention. Apart from the locking plates 1201*a*-1201*c* being in a locked position, the bottom half 401*a* is otherwise identical to the bottom half 401*a* shown in FIG. 12 and includes all the components shown in FIG. 12. A region 2102 has been circled in FIG. 21 and will be shown in an enlarged form in FIG. 22A.

Figures 22A, 22B:
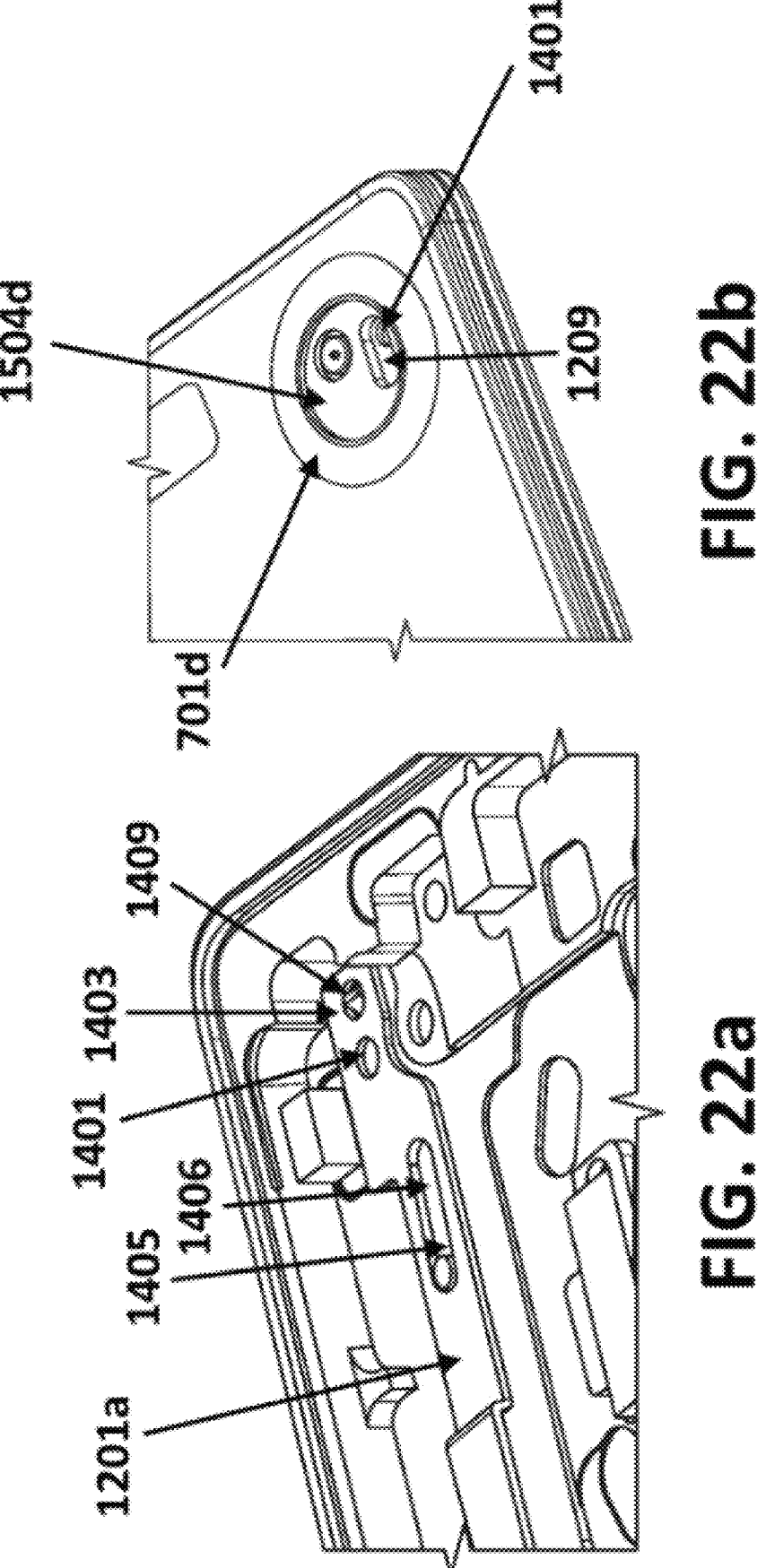
FIG. 22*a* and FIG. 22*b* illustrate a portion of the locking plate 1201*a* in a locked state from the front side of the back half 401*a* and from the rear side of the back half 401*a*, according to an embodiment of the invention.

FIG. 22*a* and FIG. 22*b* illustrate a portion of the locking plate 1201*a* in a locked state from the front side of the back half 401*a* and from the rear side of the back half 401*a*, according to an embodiment of the invention. FIG. 22A corresponds to the region 2102 shown in FIG. 21.

As shown in FIG. 22A, now that the locking plate 1201*a* has been moved to the locked position, the alignment tab 1405 is now located on an opposite end of the slot 1406 from its depiction in FIG. 14. When pulled into the locked position the alignment hole 1403 in the locking plate 1201*a* snaps over the locking post 1409 that prevents the locking plate 1201*a* from releasing due to an external impact force. Similarly, now that the locking plate 1201*a* has been moved to the locked position, the alignment hole 1401 on the locking plate 1201*a* now resides over the hole 1209 show in FIG. 12 and the locking plate 1201*a* obscures the hole 1209 from view from the front side of the back half 401*a*, as shown in FIG. 22A.

FIG. 22B shows a portion of the rear side of the back half 401*a* with the alignment hole 1401 of the locking plate 1201*a* now in a closed or locked position in the hole 1209. The alignment hole 1401 remains accessible under the volcano foot 701*d*. Disengaging the lock from the locking plate 1201*a* requires pushing down on the locking plate 1201*a* at the same time as pushing the locking plate 1201*a* towards the interior of the back half 401*a* to move the alignment hole 1403 over the locking post 1409 and move the locking plate 1201*a* back to an open position. FIG. 22*b* otherwise resembles FIG. 16 and shows the volcano foot 701*d* and the outer latch 1504*d*.

Figure 22C:
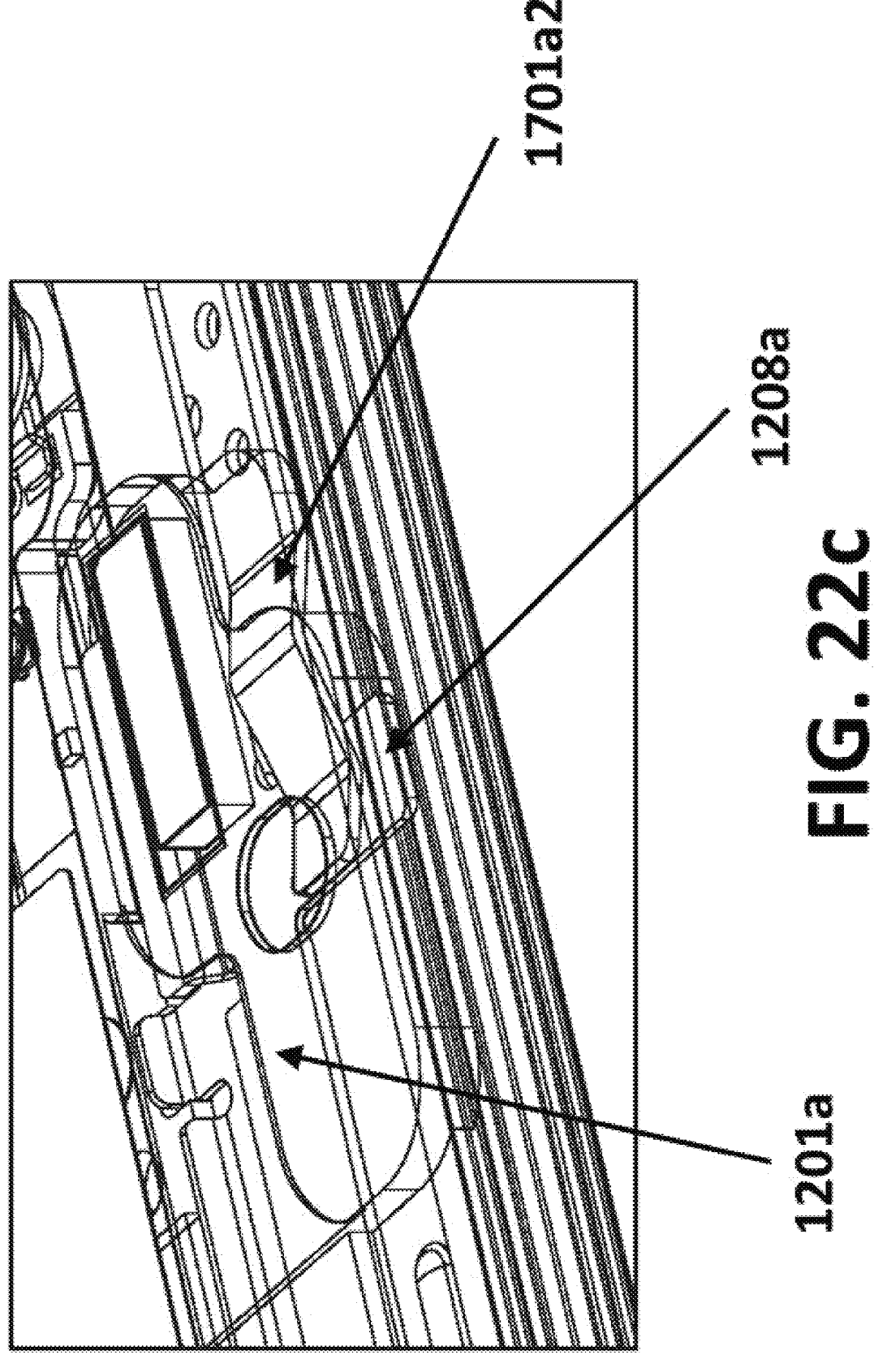
FIG. 22*c* illustrates the locking plate 1201*a* pulled into lock position, where the upper locking tab 1208*a* has slid under the locking spring 1701*a*2, according to an embodiment of the invention.

FIG. 22C illustrates the locking plate 1201*a* pulled into the lock position, where the upper locking tab 1208*a* has slid under the locking spring 1701*a*2, according to an embodiment of the invention. FIG. 22C resembles FIG. 20B, except that the upper locking tab 1208*a* of locking plate 1201*a* has pulled all the way into the locking spring 1701*a*. Once all the locking plates 1201*a*-1201*c* have been pulled into the lock position, then bottom half 401*a* and the top half 401*b* of the tablet 400 should be tightly linked together. After the locking plates are moved into the locked position, the interior of the tablet 400 may become waterproof, depending on the level of tension employed in the locking mechanism. According to some embodiments of the invention, it might not be desired or necessary for the connection to be waterproof.

ADDITIONAL CONSIDERATIONS

As discussed below, these pen-styluses can be equipped with a tail eraser allowing the user to erase content from the display of the computing device, e.g., the e-paper tablet 210. An active pen includes electronics components which enables the active pen to send and receive signals from the computing device.

This disclosed configuration provides additional precision and options for users as they go about erasing portions of drawings on an e-paper tablet. This should improve the efficiency of users interacting with e-paper tablets while also enabling them with more precise functional capabilities.

It is to be understood that the figures and descriptions of the present disclosure have been simplified to illustrate elements that are relevant for a clear understanding of the present disclosure, while eliminating, for the purpose of clarity, many other elements found in a typical system. Those of ordinary skill in the art may recognize that other elements and/or steps are desirable and/or required in implementing the present disclosure. However, because such elements and steps are well known in the art, and because they do not facilitate a better understanding of the present disclosure, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as engines, without loss of generality. The described operations and their associated engines may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise. While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A tablet device, comprising:
a first tablet half, wherein the first tablet half includes a display device;
a second tablet half; and
a locking mechanism, comprising at least three locking plates having an open position and a locked position, wherein when the locking plates are in the locked position, the first tablet half is fixed to the second tablet half;
wherein each locking plate of the at least three locking plates is slidably mounted to the second tablet half;
wherein a first end of each locking plate of the at least three locking plates is respectively positioned over an outer hole of a plurality of outer holes that passes through the second tablet half, wherein each outer hole of the plurality of outer holes respectively reside inside a support foot of a plurality of support feet on a backside of the second tablet half; and
wherein each locking plate of the at least three locking plates includes a first alignment hole and a second alignment hole, wherein each of the first alignment holes respectively reside over the plurality of outer holes when the locking plate is in an open position.

2. The tablet device of claim 1, further comprising:
a replaceable adhesive layer between the first tablet half and the second tablet half, wherein when the locking mechanism is in an open position the replaceable adhesive layer may be removed from the first tablet half and the second tablet half and replaced with a new replaceable adhesive layer.

3. The tablet device of claim 1, further comprising:
at least three locking springs, wherein each locking spring of the three locking springs locks to a different locking plate of the three locking plates when the locking mechanism is in a locked position, wherein the at least three locking springs are attached to the first tablet half.

4. The tablet device of claim 3, wherein each locking plate of the at least three locking plates includes at least one locking tab that engages with a locking spring of the at least three locking springs to lock the first tablet half to the second tablet half.

5. The tablet device of claim 1, wherein each of the second alignment holes respectively reside over the plurality of outer holes when the locking plate is in a locked position.

6. The tablet device of claim 1, wherein each locking plate includes an alignment hole located over an alignment tab, wherein the alignment tab is attached to the second tablet half.

7. The tablet device of claim 1 wherein each locking plate includes a bend that provides a spring force to maintain stability to the locking plate.

8. The tablet device of claim 1 wherein a second end of each locking plate is slidably attached to the second tablet half.

9. The tablet device of claim 8, further comprising a foam pad at the second end that facilitates sliding of the locking plate.

10. The tablet device of claim 1, further comprising:
a transceiver; and
a clip removably holding the transceiver to the second tablet half.

11. The tablet device of claim 10, further comprising:
a lock that fastens the second tablet half to the first tablet half at a corner of the device residing closest to the transceiver.

12. The tablet device of claim 1, further comprising:
a USB-c receptacle; and
a clip removably holding the USB-c receptacle to the second tablet half.

13. The tablet device of claim 1, further comprising:
a battery having at least one cell wherein the at least one cell is removably attached to the tablet.

14. The tablet device of claim 1, further comprising:
electronic power components; and
a clip removably holding the electronic power components to the second tablet half.

15. The tablet device of claim 1, further comprising:
a pogo pad; and
a clip removably holding the pogo pad to the second tablet half.

16. The tablet device of claim 1, further comprising:
a PCB board containing electronics for the tablet device; and
a plurality of screws holding the PCB board to the first tablet half.

17. The tablet device of claim 1, further comprising:
a chassis that removably holds the display device.

18. The tablet device of claim 1, wherein each of the plurality of support feet is a volcano foot.

* * * * *